(12) United States Patent
Li et al.

(10) Patent No.: US 11,690,134 B2
(45) Date of Patent: *Jun. 27, 2023

(54) MESSAGE MAPPING VIA FREQUENCY AND/OR TIME INDEXING

(71) Applicant: Apple Inc., Cupertino, CA (US)

(72) Inventors: Yang Li, Plano, TX (US); Li Su, San Jose, CA (US); Zhu Ji, San Jose, CA (US); Tianyan Pu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,316

(22) Filed: Aug. 10, 2022

(65) Prior Publication Data

US 2022/0386415 A1 Dec. 1, 2022

Related U.S. Application Data

(63) Continuation of application No. 16/391,559, filed on Apr. 23, 2019, now Pat. No. 11,457,508.

(Continued)

(51) Int. Cl.
*H04L 12/00* (2006.01)
*H04W 88/04* (2009.01)
(Continued)

(52) U.S. Cl.
CPC .............. *H04W 88/04* (2013.01); *H04W 4/70* (2018.02); *H04W 8/005* (2013.01);
(Continued)

(58) Field of Classification Search
None
See application file for complete search history.

(56) References Cited

U.S. PATENT DOCUMENTS 9,629,025 B2 4/2017 Gao
9,641,435 B1 5/2017 Sivaramakrishnan
(Continued)

FOREIGN PATENT DOCUMENTS

| CN | 101843027 | 9/2010 |
| CN | 103686985 | 3/2014 |
| CN | 104935542 | 9/2015 |

OTHER PUBLICATIONS

First Examination Report in India for Application No. 2019/14016841; dated Oct. 21, 2020; 6 Pages.
(Continued)

*Primary Examiner* — Noel R Beharry
*Assistant Examiner* — Lionel Preval
(74) *Attorney, Agent, or Firm* — Kowert, Hood, Munyon, Rankin & Goetzel, P.C.

(57) ABSTRACT

This disclosure relates to techniques for supporting message mapping via time and/or frequency indexing. For example, these techniques may be applied to device-to-device wireless communication. For example, device to device discovery may use message mapping via frequency indexing. A portion of the payload of a message, such as a discovery message, may be offloaded to a frequency and/or time index. A receiving device may determine the offloaded portion of the payload based on the frequency and/or time (e.g., subcarrier and/or slot) used to transmit the message.

20 Claims, 31 Drawing Sheets

Related U.S. Application Data

(60) Provisional application No. 62/737,966, filed on Sep. 28, 2018, provisional application No. 62/664,848, filed on Apr. 30, 2018.

(51) Int. Cl.

| | | |
|---|---|---|
| *H04W 4/70* | (2018.01) | |
| *H04W 76/11* | (2018.01) | |
| *H04W 8/00* | (2009.01) | |
| *H04W 56/00* | (2009.01) | |
| *H04W 72/02* | (2009.01) | |
| *H04W 72/0446* | (2023.01) | |
| *H04W 72/0453* | (2023.01) | |
| *H04W 88/02* | (2009.01) | |

(52) U.S. Cl.
 CPC ......... *H04W 56/001* (2013.01); *H04W 72/02* (2013.01); *H04W 72/0446* (2013.01); *H04W 72/0453* (2013.01); *H04W 76/11* (2018.02); *H04W 88/023* (2013.01)

(56) References Cited

U.S. PATENT DOCUMENTS

| | | | |
|---|---|---|---|
| 9,692,459 B2 | 6/2017 | Maltsev | |
| 11,457,508 B2 * | 9/2022 | Li | H04W 72/02 |
| 2005/0100114 A1 | 5/2005 | Satagopan | |
| 2007/0211678 A1 | 9/2007 | Li | |
| 2009/0016353 A1 * | 1/2009 | Li | H04W 8/005 370/395.3 |
| 2014/0010172 A1 * | 1/2014 | Wei | H04W 76/14 370/328 |
| 2014/0254429 A1 * | 9/2014 | Wang | H04L 27/2602 370/254 |
| 2015/0282143 A1 | 10/2015 | Kim | |
| 2015/0326362 A1 | 11/2015 | Xiong | |
| 2016/0016562 A1 | 1/2016 | McKnight | |
| 2018/0115937 A1 | 4/2018 | Poitau | |
| 2018/0332476 A1 | 11/2018 | Shaw | |
| 2019/0268829 A1 * | 8/2019 | Abedini | H04W 28/04 |

OTHER PUBLICATIONS

First Office Action for Chinese Patent Application No. 201910358028.5; 10 pages; dated Jan. 17, 2022.

Intel Corporation "On D2D Discovery Preamble and Reference Signals"; 3GPP TSG RAN WG1 Meeting #76bis R1-141159; Shenzhen, China; 7 pages; Apr. 4, 2014.

\* cited by examiner

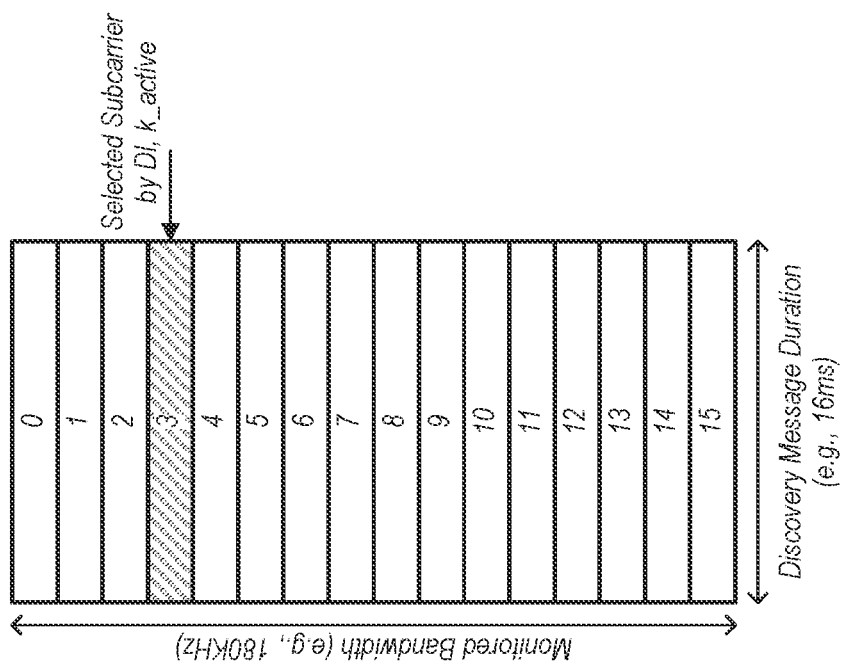
FIG. 9
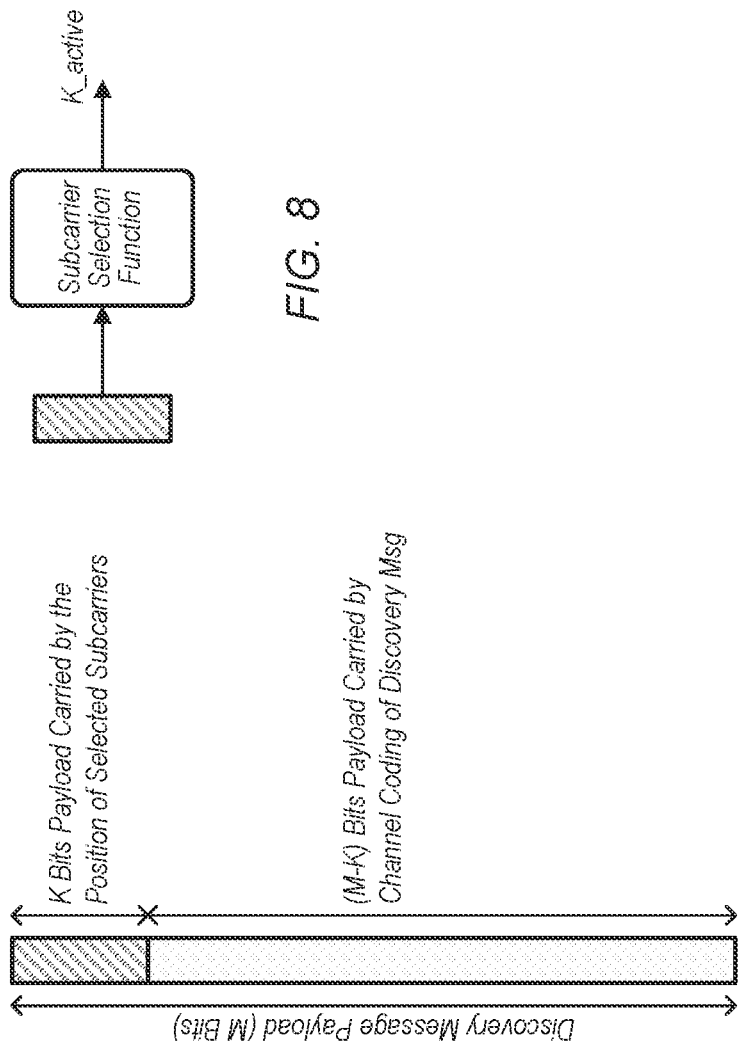
FIG. 8
FIG. 7

| Bit Field | Slot Index |
|---|---|
| "0000" | 0 |
| "0001" | 1 |
| ...... | ...... |
| "1110" | 14 |
| "1111" | 15 |

MESSAGE MAPPING VIA FREQUENCY AND/OR TIME INDEXING

PRIORITY CLAIM

This application is a continuation of U.S. patent application Ser. No. 16/391,559, entitled "Message Mapping via Frequency and/or Time Indexing," filed Apr. 23, 2019, which claims priority to U.S. provisional patent application Ser. No. 62/664,848, entitled "Message Mapping via Frequency Indexing," filed Apr. 30, 2018 and to U.S. provisional patent application Ser. No. 62/737,966, entitled "Message Mapping via Frequency Indexing," filed Sep. 28, 2018, each of which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to schemes for message mapping via frequency indexing that could be used for device-to-device wireless communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. One new feature is device-to-device (D2D) communication, in which devices must perform discovery. Discovery messaging between devices may incur signaling overhead. Such discovery messaging may require relatively high coding rates, thus negatively impacting decoding performance. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for using a frequency (e.g., subcarrier) index and/or time (e.g., slot) index to convey certain information. One exemplary application may be performing synchronization using frequency indexing as part of narrowband device-to-device wireless communications. The information carried by indexing (whether in frequency and/or time) may be part of the overall payload of a message and/or part of preamble identification (e.g., in discovery).

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device (D2D) communications. This disclosure presents various techniques for supporting such communications, including features and techniques for performing device-to-device discovery using message mapping via frequency indexing. In other words, at least some information may be conveyed via selection of a specific frequency or frequency range (e.g., subcarrier) for discovery messaging. These techniques may reduce signaling overhead for D2D discovery communications and/or may improve decoding performance (e.g., by allowing lower coding rates). Further, design features of an exemplary discovery message are presented. Similar techniques and design features may also be applied in a time index based mapping scheme.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 7-9 illustrate various elements of discovery message design for device-to-device wireless discovery communications using message mapping via frequency indexing, according to some embodiments;

FIGS. 54 and 55 illustrate an exemplary mapping scheme.

Figure 1:
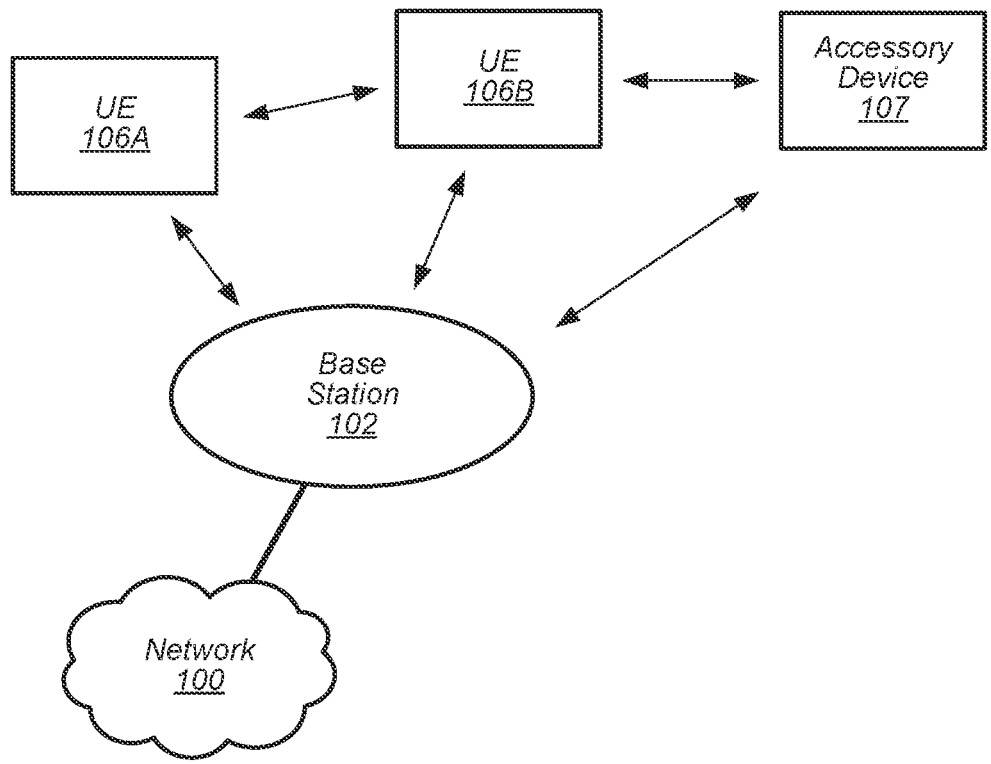
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
NR: New Radio
OGRS: Off Grid Radio Service
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/ receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
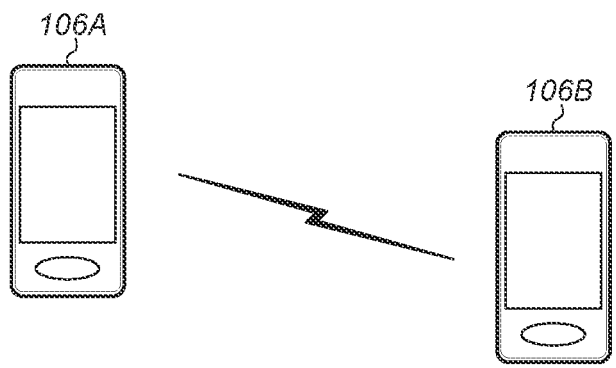
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS- CDMA), LTE, LTE-Advanced (LTE-A), NR, Off-grid radio service (OGRS), HSPA, 3GPP2 CDMA2000 (e.g., 1xRTT, 1xEV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing narrowband D2D communication with each other even when out-of-coverage of the BS 102 and other cellular base stations.

FIG. 2 illustrates example UE devices 106A, 106B in D2D communication with each other. The UE devices 106A, 106B may each be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
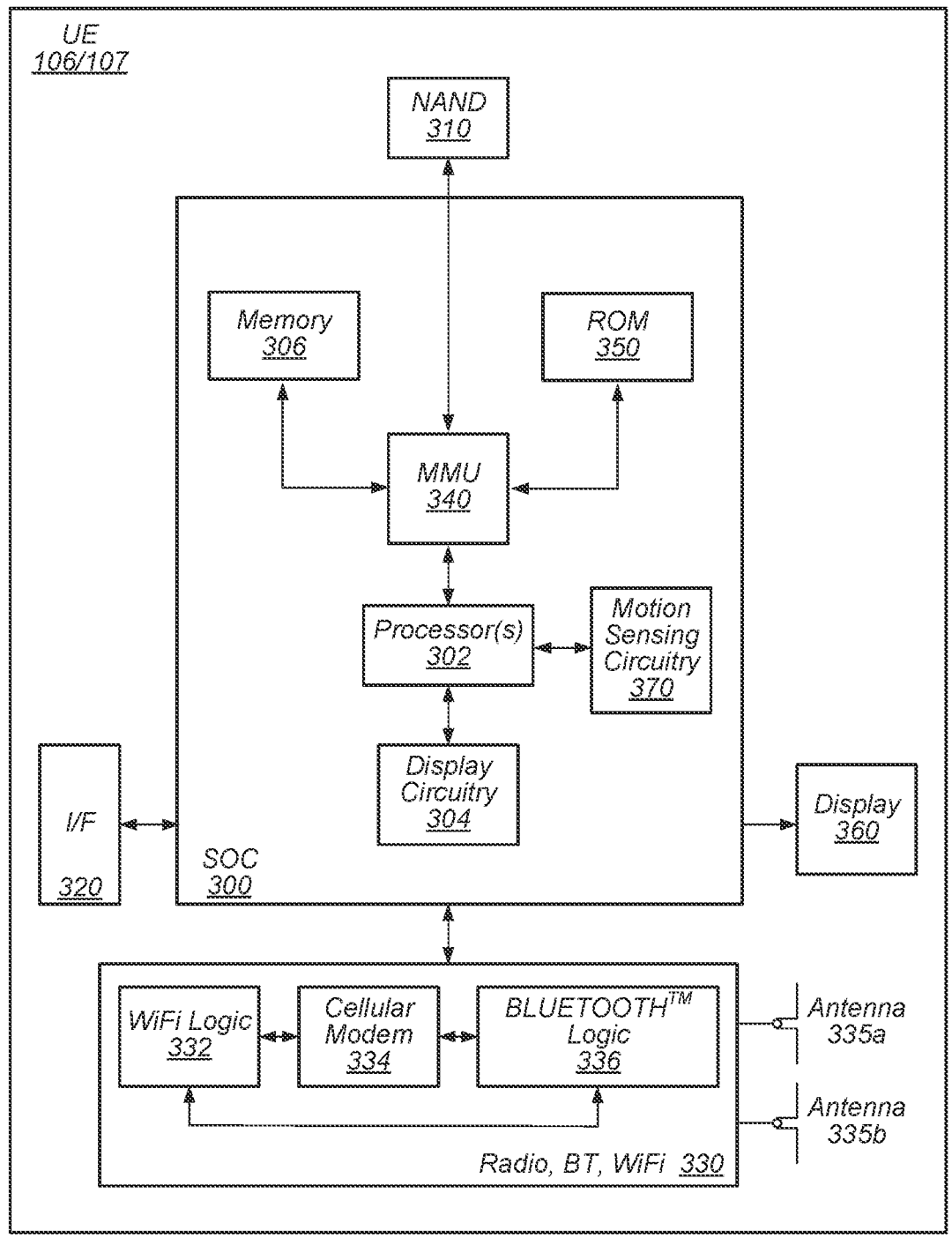
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications.

The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
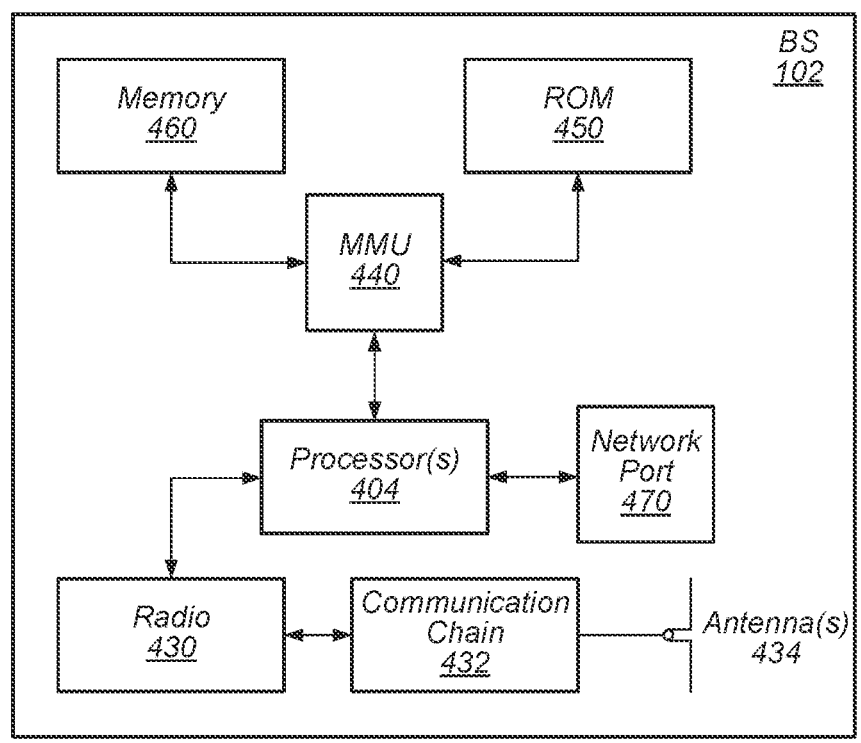
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform narrowband device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
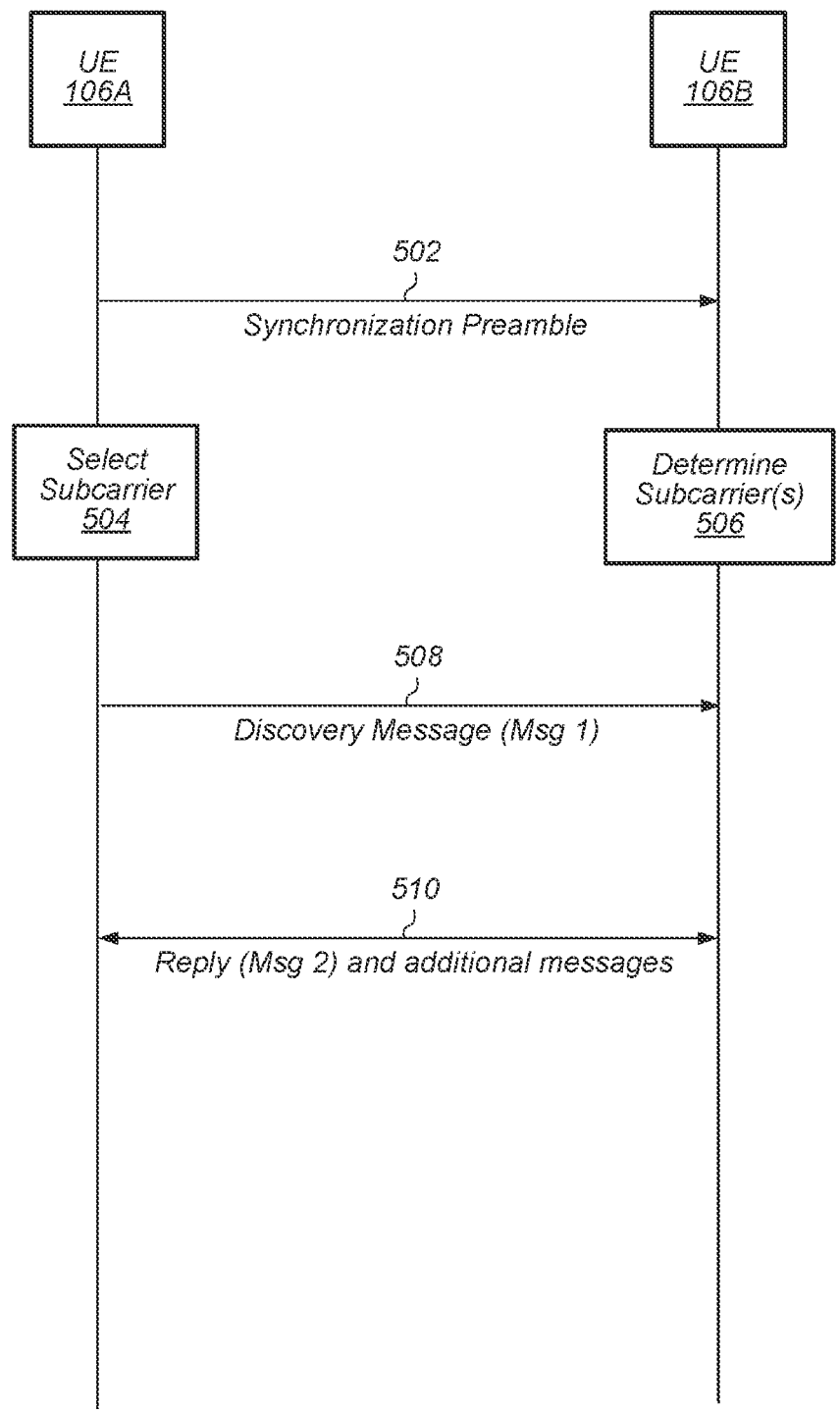
FIG. 5 is a communication flow diagram illustrating an exemplary method for performing device-to-device wireless discovery communications using message mapping via frequency indexing, according to some embodiments.

FIG. 5—Communication Flow Diagram

In D2D communication, a preamble approach may be used for discovery, at least as one possibility. The discovery procedure may consist of two parts: preamble detection and discovery message (e.g., including msg1 and msg2) decoding. It may be possible to infer some discovery information from detection of the preamble sequence, e.g., part of the discovery receiver (DR) identifier (ID). However, some discovery information (e.g., discovery initiator (DI) ID) may not be inferred from the preamble, and may be sent via discovery message (e.g., msg1 and msg2). Msg1 and msg2 may be transmitted via a selected subcarrier among a set of subcarriers. Reducing the size of msg1 and msg2 may reduce signaling overhead associated with discovery, and may therefore benefit devices performing D2D communications as well as the wireless system more generally. For example, due to a reduced size of the msg1 and/or msg2, the devices may use lower coding rates to transmit and receive the messages. Thus, decoding performance may be improved.

FIG. 5 is a communication flow diagram illustrating a method for performing discovery as part of device-to-device wireless communications, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as the UEs 106A-B or 107 illustrated in and described with respect to FIGS. 1-3, or more generally in conjunction with any of the computer systems or devices shown in the above Figures, among other devices, as desired. For example, a processor (and/or other hardware) of such a device may be configured to cause the device to perform any combination of the illustrated method elements and/or other method elements. Note that while at least some elements of the method of FIG. 5 are described in a manner relating to the use of communication techniques and/or features associated with LTE, OGRS, and/or 3GPP specification documents, such description is not intended to be limiting to the disclosure, and aspects of the method of FIG. 5 may be used in any suitable wireless communication system, as desired. As shown, the method may operate as follows.

In 502, a first wireless device (e.g., UE 106A) may provide a synchronization preamble to a second wireless device (e.g., UE 106B), e.g., in accordance with a D2D wireless communication framework. The first wireless device may be referred to herein as a discovery initiator (DI) and the second wireless device a discovery receiver (DR). In some embodiments, the second wireless device may be one of multiple wireless devices, e.g., there may be more than one DR device.

The synchronization (sync) preamble may include or otherwise imply at least partial identification information for the intended receiver or receivers and/or of the DI device. The sync preamble may be structured according to a type of discovery that the DI is attempting to initiate. Example discovery types include peer-to-peer and presence discovery.

In peer-to-peer (P2P) discovery according to the D2D communication framework, the sync preamble may include at least part of the (e.g., singular) intended recipient's DR identifier (DR ID). P2P discovery may refer to discovery in circumstances that the DI intends to initiate communication with a specific DR (e.g., possibly a specific group of DRs). Thus, the sync preamble may be used to identify the specific intended DR(s).

In presence discovery, the sync preamble may include at least part of a common or presence DR ID. Such a common DR ID may be used in circumstances in which the DI intends to announce its presence, e.g., so that all devices configured to utilize the D2D communication framework that are in range will be aware of its presence and availability to communicate. The common DR ID may be known to all such devices, e.g., so that all such devices may monitor communications associated with the common DR ID. In presence discovery, the sync preamble may include all or part of the ID of the DI device (DI ID). The DI ID may be associated with the sync preamble in addition to the common presence ID, or the common ID may not be associated with the sync preamble.

In some embodiments, the sync preamble may include only part of the DR and/or DI ID. Thus, the DR or DRs may need to wait for a future message (e.g., a discovery message or msg 1, described in detail below) to determine the entire ID, e.g., the identity of the device or devices with which the DI intends to perform discovery.

The sync preamble may be transmitted on one or more subcarriers of a plurality of possible subcarriers. The subcarrier(s) used may be selected by any of various means. For example, the subcarrier(s) may be selected randomly, pseudo-randomly, according to a frequency hopping scheme, or a predetermined subcarrier may be used for this purpose.

The synchronization preamble may include one or more synchronization sequences. Each synchronization sequence may include a basis sequence that is transmitted on a certain number of subcarriers (e.g., in the frequency domain) and spans one or more OFDM symbols (e.g., in the time domain). The basis sequence may be repeated multiple times. The synchronization sequence may further include a cover code. For example, each OFDM symbol of the synchronization sequence may be multiplied by a cover bit of the cover code. As another possibility, each basis sequence (e.g., potentially including multiple OFDM symbols) may be multiplied by a cover bit of the cover code.

The synchronization sequence may be provided as part of a narrowband D2D/P2P communication. The communication may be performed using one or more Narrowband Internet of Things (NB-IoT) carriers, and/or may be performed using any of various other possible (e.g., narrowband) carriers. Thus, as one possibility, the synchronization sequence may be transmitted on a carrier frequency that has a frequency width of one physical resource block (e.g., 12 or 14 subcarriers having subcarrier spacing of 15 kHz, in some instances)

The synchronization sequence may be selected from multiple possible synchronization sequences. For example, multiple basis sequences may be possible, and multiple cover codes may be possible. Each unique possible synchronization sequence may include a unique basis sequence among the specified possible basis sequences combined with a unique cover code among the specified possible cover codes. Thus, in some instances, there may be a large number of possible synchronization sequences.

In some instances, the synchronization sequence(s) may be selected based at least in part on device identification information for the first wireless device, the second wireless device, and/or a link between the first wireless device and the second wireless device.

The second device(s) (e.g., UE 106B) may receive and decode the synchronization preamble.

In 504, the first device (e.g., the DI, e.g., UE 106A) may select a subcarrier to transmit a discovery message (e.g., msg 1). In other words, the DI may select one subcarrier (e.g., k_active) of N available subcarriers to use for this purpose.

In some embodiments, the subcarrier may be selected at random. In other words, a selected subcarrier may be selected using a function such as: k_active=uniform (0 . . . N−1). Such random selection may reduce the probability of collision, e.g., between discovery messages transmitted by different DI devices.

In some embodiments, the subcarrier may not be selected randomly, and may instead be selected according to a message mapping via frequency indexing scheme, e.g., so that the subcarrier selection carries part of the payload of the discovery message itself. Given the random nature of the payload, the payload may effectively serve as a pseudo-random basis for selecting a subcarrier. Accordingly, the collision rate may be reduced by the random (e.g., pseudo-random) selection of the subcarrier. In other words, the subcarrier may be selected based on a number of bits (e.g., K bits) of the payload of the discovery message (see also FIG. 7 and associated discussion below). Thus, a DR may be able to infer the K bits of the payload based on the identity (e.g., index) of the selected subcarrier. For example, the subcarrier may be selected based on the DR ID, e.g., based on a part of the DR ID that was not transmitted in the synchronization preamble. The K bits may be referred to as an offloaded portion of the payload of the discovery message, e.g., because these bits are offloaded to the frequency indexing and thus do not need to be transmitted via channel coding, e.g., in the body of the discovery message. K may be greater than or equal to 1. The (e.g., maximum) number of bits (K) that may be carried by the subcarrier selection may be equal to the logarithm (base 2) of the number of available subcarriers, e.g., $K=\log_2(N)$.

The first device may use any one-to-one function (e.g., f) to select the subcarrier, e.g., k_active=f(x,u).

x may represent the value decided by the K bits of the payload that is carried by the subcarrier selection. As noted above, in some embodiments (e.g., in P2P discovery), x may be based on a part of the DR ID that was not transmitted in the sync preamble. Thus, the subcarrier selection may encode/carry the information of the remainder (e.g., not previously transmitted bits) of the DR ID. In some embodiments (e.g., in presence discovery), x may be based on a part of the DI ID that was not transmitted in the sync preamble. In general, any part of the discovery message payload may be offloaded to subcarrier index mapping (e.g., via x), as long as that portion is sufficiently random.

u may be a variable related to other information and may be independent of the K bits of payload. For example, u may be based on frame index. One use case of u may be to perform subcarrier hopping across frames.

Various exemplary formulas for selecting subcarrier k_active are described below. Note that additional formulas are possible and may be selected as desired. Among other possibilities, note that variations or combinations of the mathematical features of these formulas are possible. These formulas may use the following parameters:

$$K=\text{floor}(\log 2(N));$$

$$L=N-2^K;\text{ and}$$

K bits payload may be represented as: [b0 b1 ... bK−1] (bi is either 0 or 1), which has decimal value x: x=binary-to-decimal ([b0 b1 ... bK−1]).

Example 1: k_active=mod(x, N). This example may have the advantage of simplicity.

Example 2: k_active=mod(x+u*L, N), where u={0: discovery message type 0, 1: discovery message type 1}. For instance, discovery message type 0 may correspond to P2P discovery and message type 1 may correspond to presence discovery. This example may offer the benefit of reducing the overlap between different discovery types (e.g., P2P discovery may occur on a different subset of subcarriers than presence discovery), and thus may reduce the likelihood of collision.

Example 3: k_active=mod(x+u*L, N), where u=frame_index. Frame index may be known to both the DI and DR devices. This example may have the benefit of hopping through all available subcarriers over time. Thus, collision probability may be reduced. Any measure of time may be used in place of the frame index.

Example 4: k_active =mod(x+u*L, N), where u=decimal value of prior known DI information. This example may have the benefit of reducing overlap between different DIs, e.g., by adding a DI-specific subcarrier offset. Similarly, part of prior known DR information may be used. Any other prior known information (e.g., known to both the DI and the DR) may be used. Thus, collision probability may be reduced.

Example 5: k_active=mod(x+u*L, N), where u provides an indication of service type, e.g., a service that is executing on the DI device and/or a service for which the DI device would like to exchange information, e.g., with one or more DR devices. More than one service may be indicated. Further, the service type indication may describe the nature of data traffic patterns for the service(s) (e.g., packet length (e.g., mean and/or variance, etc.), packet timing (e.g., period, regularity, interval, etc.)).

Example 6: k_active=mod(x+u*L, N), where u provides an indication of the timing accuracy level. Such an indication may inform DR devices of how accurate the timing information available to the DI device is. Such information may be useful in coordinating communications, e.g., based on frame number.

Example 7: k_active=mod(x+u*L, N), where u provides an indication of a priority order metric. Such a priority order metric may correspond to the priority of traffic/data that the DI device wishes to exchange with one or more DR devices. For example, the priority metric may be similar to a quality of service (QoS) class indicator (QCI), e.g., the priority metric may be or include QCI and/or a related indicator. Further, the priority order may indicate the urgency with which the DI device wishes to establish communication.

Example 8: k_active=mod(x+u*L, N), where u provides an indication of an identity of the user or purpose of the DI device. For example, u may indicate that the DI device is used for emergency services, military, etc., purposes. Alternatively, u may indicate that the DI is used by a private company or other specific group. Thus, the indication may alert receiving devices in the same group of users/purposes to respond and/or may alert other devices not to respond.

As noted above, any part of the discovery message payload may be offloaded to subcarrier index mapping (e.g., via x), as long as that portion is sufficiently random. In P2P discovery, DR ID may be fully identified upon receiving the discovery message (msg 1). Note that DR ID may not be fully known before the discovery message, thus K bits of the DR ID may be used as input x for the subcarrier mapping function. For example, K bits of the most or least significant bits (e.g., MSB/LSB) (or other prior agreed part) of the unknown part of the DR ID may be selected as the payload. Alternatively, Q bits of MSB/LSB of the unknown part (e.g., not previously transmitted) of DR ID, and (K-Q) bits may be selected from the known (e.g., previously transmitted) part of the DR ID. This selection may be implemented either as a single bit or XOR of a set of bits. For example, using a single bit may allow the use of additional subcarriers (e.g., in the case of Q=3 bits, a fourth bit (e.g., 4−3=1 bit from the known part of the DR ID) may allow selection between $2^4$=16 subcarriers, rather than $2^3$=8 subcarriers. Similarly, multiple bits may be used (e.g., via XOR), e.g., as u, similar to example 4 above.

In payload mapping of a presence discovery message, the DI ID may not be known to the DR device(s) prior to receiving the discovery message. Note that in presence discovery, a DR may monitor a common/group presence ID, and may not know whether the DI has indicated the common ID (e.g., in the sync preamble, e.g., indicating presence discovery or P2P discovery) before decoding the discovery message. In the case of presence discovery, the payload may be mapped (e.g., as x) in any of various ways. In one example, K bits of the most or least significant bits (e.g., MSB/LSB) (or other prior agreed part) of the DI ID may be selected as the payload, x. In a second example, K bits of the MSB/LSB (or other prior agreed part) of the unknown part of the common/presence ID may be used. In a third example, Q bits of MSB/LSB of the unknown (e.g., not previously transmitted) part of the common/presence ID, and (K-Q) bits may be selected from the known (previously transmitted) part of the common/presence ID. This selection may be implemented either as a single bit or XOR of a set of bits, e.g., as discussed above for P2P discovery. The benefit of the second and third examples may be to reduce false alarms of common/presence ID monitoring (e.g., reduce the frequency that a DR device may wrongly determine that a DI is announcing presence when the DI actually intends to perform P2P discovery).

In some embodiments, multiple subcarriers may be selected. Thus, payload information may be encoded based on each of the subcarriers, and/or the combination of subcarriers selected.

As explained in more detail below (see FIGS. 18-19), carrying a portion of the (e.g., complete) payload in this manner (e.g., via subcarrier indexing, e.g., offloading) may allow the wireless device (e.g., DI) to reduce the amount of the payload sent via channel coding the discovery message. In other words, by offloading a portion (e.g., K bits) of the complete payload (e.g., M bits), the DI may transmit (e.g., via channel coding) only a remaining, non-offloaded portion (e.g., M-K bits). However, the full payload (e.g., M bits) may be reconstructed by the DR, e.g., by directly decoding the non-offloaded portion and inferring the offloaded portion based on the frequency mapping. The reduction in the number of bits carried by channel coding may allow for a lower code rate and may result in better decoding performance. Additionally or alternatively, signaling overhead may be reduced.

In 506, the second device (e.g., or second devices, DR) may determine which, if any, subcarriers to monitor, e.g., during a period of time in which the DR may anticipate receiving a discovery message from the DI. The determination may be based at least in part on the synchronization preamble.

In some embodiments, a DR may determine to monitor a single frequency, e.g., which may correspond to its DR ID or to a common presence ID. For example, based on decoding the synchronization preamble, the DR may determine that a partial DR ID associated with the preamble may potentially match either its DR ID or a common presence ID. Based on such a determination, the DR may monitor the subcarrier that corresponds to that ID, e.g., according to a message mapping via frequency indexing scheme. In other words, the DR may monitor the subcarrier that a DI would use to indicate the ID (e.g., DR ID or presence ID) corresponding to the DR. In some embodiments, both the DR ID and separately the common ID may potentially match the partial ID associated with the preamble, and the DR may accordingly monitor both channels.

In some embodiments, e.g., based on detecting a common/presence ID in the sync preamble, the DR may monitor all subcarriers. The DR may be able to determine payload information associated with a discovery message based on the subcarrier used to transmit the message.

In some embodiments, e.g., based on detecting a DR ID in the sync preamble that does not match either the DR's DR ID or a common presence ID, the DR may not monitor any subcarriers. In other words, the DR may determine to sleep or enter a low power state for the period of time associated with the discovery message, e.g., because the sync preamble indicates that the discovery message is not intended for the DR.

In 508, the first device (DI) (e.g., UE 106A) may transmit a discovery message (Msg 1) to the second device(s) (DR) (e.g., UE 106B) using the selected subcarrier. As described herein, some payload information (x, e.g., the offloaded portion, e.g., including K bits) may be encoded in (e.g., indicated by) the subcarrier selection, and other payload information (e.g., the non-offloaded portion, e.g., M-K bits) may be transmitted via channel coding or other techniques. The discovery message may include information such as DR ID and/or DI ID, among various possibilities.

The DR device(s) may receive and decode the discovery message. Based on the identity of the subcarrier used, the DR may infer the offloaded payload information (x) indicated by the subcarrier selection. Further, the DR may decode the other (e.g., non-offloaded) payload information. Thus, based on the offloaded and non-offloaded portion of the payload information, the DR may determine the complete payload of the message.

In 510, the DR device(s) (e.g., UE 106B) may respond (msg 2) to the DI (e.g., UE 106A). Any such responses may be based on the payload information of the discovery message (msg 1). For example, based on determining that the discovery message (in combination with the sync preamble) indicated the DR ID of the DR device (e.g., P2P discovery), the DR device may reply with msg 2 to continue P2P discovery and further communication with the DI. Similarly, in the case of presence discovery, some or all DR devices may respond with identifying information (e.g., DR ID), e.g., which may enable the DI device to send P2P discovery messages targeted to specific DR devices in future discovery windows.

In some embodiments, the DR device(s) may not respond. For example, based on determining that a P2P discovery message is not directed to a DR device's DR ID, that DR device may not respond. Similarly, it may be the case that no response may be necessary to a presence discovery message.

FIGS. 6-53—Additional information

FIGS. 6-53 and the following additional information are provided as being illustrative of further considerations and possible implementation details relating to the method of FIG. 5 and are not intended to be limiting to the disclosure as a whole. Numerous variations and alternatives to the details provided herein below are possible and should be considered within the scope of the disclosure.

Figure 6:
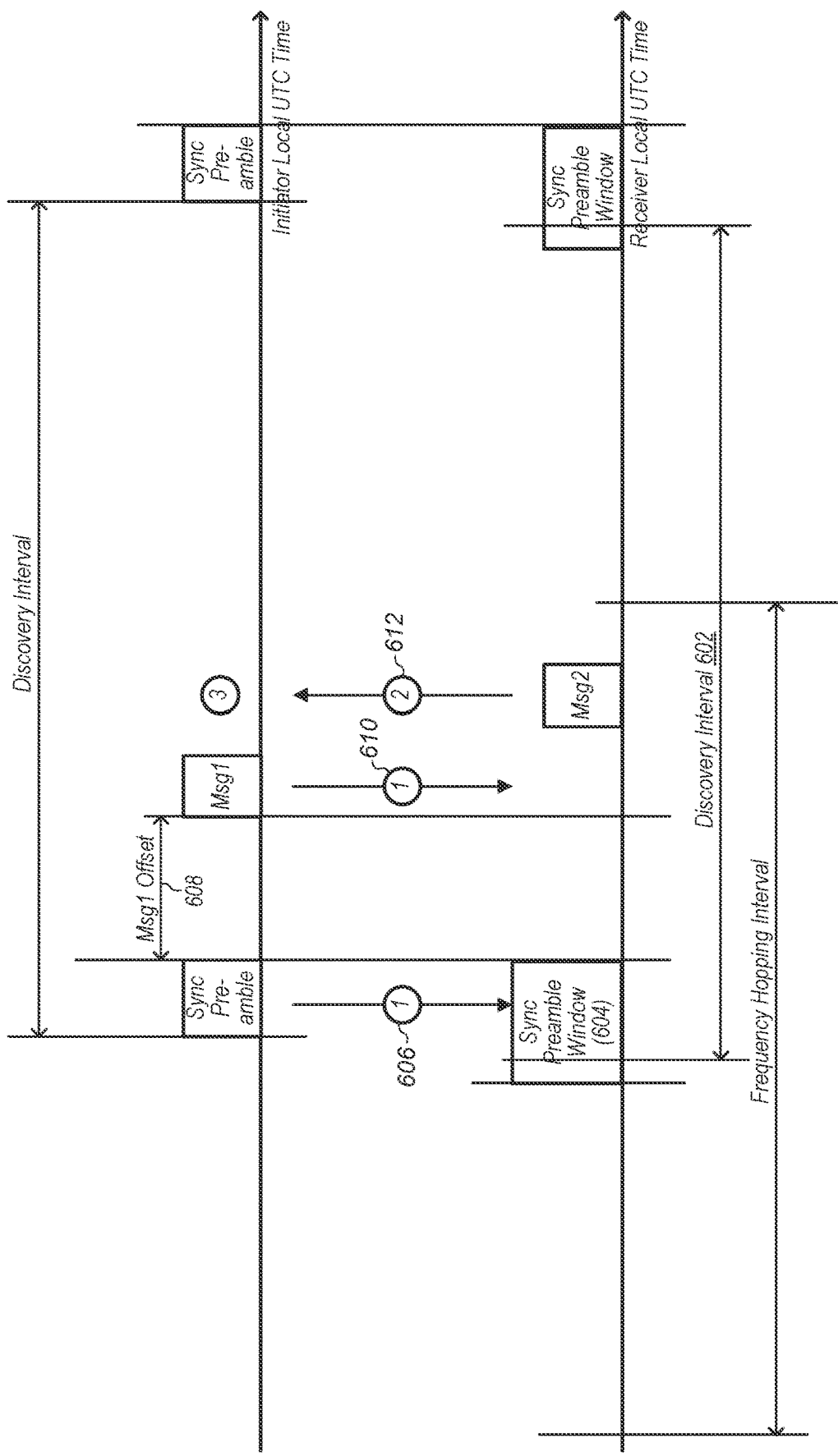
FIG. 6 illustrates possible timing of various aspects of an exemplary possible framework for device-to-device wireless discovery communications using message mapping via frequency indexing, according to some embodiments.

FIG. 6—Timing of D2D Communications Using Message Mapping Via Frequency Indexing A variety of frameworks and framework elements may be possible for D2D wireless communication, e.g., including wide- and narrowband implementations, implementations that utilize a synchronization master device for synchronization, and/or implementations that utilize a preamble-based approach to performing synchronization, among various possibilities. At least for some devices (e.g., in consideration of their transmit power regimes), propagation characteristics for narrowband communications may result in greater range capacity than wider-band communications. Note that effective communication range may be further increased, at least in some instances, if a lower-frequency communication band (e.g., 900 MHz unlicensed spectrum, as one possibility) is used for the narrowband D2D communications. As another possibility, some (e.g., lower complexity) devices may be configured to perform only narrowband communications (e.g., may have RF front end limitations, and/or may have battery limitations functionally limiting capability to perform wider-band communications). As yet another possibility, some devices, even if capable of both wideband and narrowband communication, may prefer to perform narrowband communication when possible, e.g., if the narrowband communication can reduce power consumption by the devices.

The techniques described herein may be used in scenarios when one or more of the communicating wireless devices are not within communication range of a cellular base station (e.g., the devices may be out-of-coverage/OOC), according to some embodiments.

For example, Off Grid Radio Service (OGRS) is a system that is being developed to provide long range peer-to-peer (P2P)/D2D communication, e.g., in absence of a wide area network (WAN) or WLAN radio connection to support a variety of possible features. At least according to some embodiments, OGRS systems may support some or all of the features previously described herein with respect to FIG. 5.

According to some embodiments, OGRS may operate in unlicensed low ISM bands, e.g., between 700 MHz and 1 GHz, for extended range purposes, and may use one or multiple carriers of approximately 200 kHz. OGRS may be designed to meet the local spectrum regulatory requirements, such as channel duty cycle, operating frequencies, hopping pattern, LBT, maximum transmit power, and occupied bandwidth.

As one possibility for providing the physical narrowband carrier for narrowband D2D communications, a NB-IoT carrier may be used. According to some embodiments, NB-IoT carriers may be configured for use in standalone deployments (e.g., in a repurposed GSM band), guardband deployments (e.g., in a guardband frequency between LTE carriers), and inband deployments (e.g., within an LTE carrier). Alternatively, it may be possible to utilize a NB-IoT carrier in an unlicensed frequency band, e.g., in an OGRS context. In any of these possible deployment modes, NB-IoT carriers may include a variety of key features. For example, among various possible characteristics, NB-IoT carriers may support flexible timelines for control and data channels; peak rates of approximately 20 kbps in the downlink and 60kbps in the uplink may be supported; single tone (e.g., 3.75 KHz vs. 15 KHz) and multi tone (15 kHz) uplink modulation, using pi/2 binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. Frequency hopping features for D2D communications may be supported. In some instances, NB-IoT carriers may provide coverage enhancement features for supporting coverage up to 20 dB.

Any of a variety of features may be associated with an OGRS system, including when operating in regulated unlicensed spectrum, such as 900 MHz unlicensed spectrum. For example, frequency hopping spread spectrum (FHSS) may be used. Channel carrier frequencies may be separated by a minimum of 25 kHz, or the 20 dB bandwidth of the hopping channel, whichever is greater. If the 20 dB bandwidth is less than 250 kHz (e.g., as may be the case if NB-IoT carriers are used), the system may use at least 50 channels. In this case, the average dwell time on a particular channel may not exceed 400 ms within a 20 second period (e.g., duty cycle<=2%), and/or transmit power may be limited to 30 dBm. If the 20 dB bandwidth is 250 kHz or greater, then the system may use at least 25 channels. In this case, the average dwell time may not exceed 400 ms within a 10 second period (e.g., duty cycle<=4%), and/or transmit power may be limited to 24 dBm. For example, the following table illustrates a possible set of specified features for OGRS operation depending on the 20 dB bandwidth of the hopping channels used:

| BW | #Channel | TX Power | On Time | Dwell Time |
| --- | --- | --- | --- | --- |
| <250 KHz | >=50 | 30 dBm | 400 ms | 20 sec |
| >250 KHz | >=25 | 24 dBm | 400 ms | 10 sec |

Thus, if the 900 MHz unlicensed spectrum band (US ISM 900, 902-918 MHz) is used in conjunction with NB-IoT carriers (e.g., each having 200 kHz including guard bands), it may be possible to configure a pool of 80 frequencies, as one exemplary possibility. In another configuration, a pool of 130 frequencies spanning 902-928 MHz may be possible. Other frequency pools, e.g., having other numbers of frequencies available, are also possible. Various sets of those frequencies may be configured as "scan channels" and "page channels", which may be used for discovery and/or other purposes, if desired.

One possible approach to providing synchronization within a D2D communication framework may include a set of devices in a geographical area synchronizing to the symbol/subframe/frame timing and carrier frequency provided by one of the devices, which may be referred to as a synchronization master, or in any of various other manners. This approach may be similar in at least some ways to a cellular network in which wireless devices in a given area may camp on a base station.

However, such an approach may result in devices' coverage range being limited by the synchronization master's range, such that it may be possible for two devices to not be able to communicate despite being within communication range from each other if one is within the sync master's range and the other is out of the sync master's range. It may also be possible for two devices to be within communication range from each other, but to be synchronized to different sync masters with different synchronization schemes.

Further, such an approach may result in an additional power consumption burden upon the device selected to be the synchronization master, e.g., since it may be expected to transmit synchronization reference signals at a high power level to provide a maximum possible range for the D2D communication group. Such a burden may be distributed among devices, e.g., by rotating the sync master position among devices, however, this may introduce communication interruptions, extend discovery latency among devices, and/or require a more complex synchronization system design in order to provide for event driven and/or periodic triggered master/relay selection/re-selection/handover between different sync sources.

Still further, such a system may have a potentially substantial likelihood for collisions during discovery, e.g., since many devices may sync to the same timing and frequency scheme provided by a sync master.

Accordingly, as a possible alternative, a D2D communication framework utilizing a synchronization scheme that does not rely on a sync master device to provide synchronization signals for an entire D2D communication group may be used, at least according to some embodiments described herein. For example, a preamble-based approach to performing synchronization for narrowband D2D wireless communication may be used. FIG. 6 illustrates possible timing of various aspects of such an exemplary preamble based D2D communication framework, according to some embodiments.

According to such a framework, a discovery window may be preserved by each wireless device for receiving synchronization sequences from other devices. Devices utilizing such a framework may refer to coordinated universal time (UTC) (e.g., as acquired via global navigational satellite system (GNSS) capability or in any of various other ways) or another specified common reference clock to determine when each discovery window occurs, at least according to some embodiments.

Each preamble transmission (which may include a synchronization sequence) may be associated with device identification information, in some instances. For example, if a first device wants to establish a link with a second device, it may transmit a preamble including a synchronization sequence that is determined by and associated with identification information for the first device. The preamble may be followed by one or more other (e.g., discovery related) messages. When the first device detects the presence of this preamble (e.g., that is associated with identification information for the first device), the first device may continue to receive the following messages to proceed with discovery and link establishment.

Additionally, or alternatively, in some instances (e.g., once link establishment has occurred), the synchronization sequence used during preamble transmission may be selected based at least in part on link identification information for a link associated with the preamble transmission. For example, once the first device and the second device have performed link establishment and established a link identifier for the link between the first device and the second device, control and/or data communications between the first device and the second device may utilize a preamble that includes a synchronization sequence selected based at least in part on the link identifier.

As shown, the example framework of FIG. 6 illustrates an example discovery interval (602). Discovery intervals may occur periodically (e.g., according to a regular schedule/period, e.g., based on UTC time) and may thus allow for devices to periodically perform discovery and initiate D2D communications. A discovery interval may begin with a sync (e.g., synchronization) preamble window (604) for a discovery receiver (DR) device. During the sync preamble window, a discovery initiator (DI) device may transmit a sync preamble (606). The sync preamble may include part of the identification of the DR (e.g., DR ID) of a device that the DI intends to communicate with. In the case of presence discovery, the sync preamble may include part of the identification of a common/presence ID, e.g., which may indicate that the DI will announce its presence so that all other devices (e.g., DRs) in range may be aware of its presence and availability for communication. Further, the sync preamble may include all or part of a DI ID.

Following the sync preamble window, the DI and DR devices may wait for a period of time (msg 1 offset) (608). Then, the DI device may transmit a first discovery message (msg 1) (610). As described above, the DI device may include some payload information in the message itself (e.g., via channel coding) and may include some other payload information by selecting a subcarrier on which to send the message. The DR device may determine the content of the discovery message by decoding the channel coded information and inferring the other information from the subcarrier used.

Following the first discovery message, the DR device may respond (msg 2) (612). The devices may proceed with further communication during the remainder of the discovery interval and/or future intervals.

FIGS. 7-9—Discovery Message Design

FIGS. 7-9 illustrate discovery message design using subcarrier indexing to convey a portion of the payload information.

As shown in FIG. 7, a discovery message payload of M bits may be subdivided into a first portion (e.g., K bits, e.g., corresponding to x) to be conveyed by subcarrier selection and a second portion (M−K bits) to be carried by channel coding. Note that the relative proportions of K and M−K are illustrative only, and other relative sizes are possible. As illustrated in FIG. 8, the first portion of K bits may be an input to a subcarrier selection function, which may select a subcarrier (k_active) to be used to transmit the discovery message. The subcarrier selection function may be expressed as k_active=f(x, u). As noted above, the relation between the number of available subcarriers (N) and K is given by K=$\log_2$(N), thus the more subcarriers are available, the more information may be encoded via subcarrier selection. FIG. 9 illustrates a set of time/frequency resources available for the discovery message transmission. As shown, there may be 16 available subcarriers (e.g., implying that K may be 4) and the message is transmitted on subcarrier 3 (k_active). Thus, in the illustrated example, 4 bits (e.g., K=4) of the payload of the discovery message and the remaining M−K=M−4 bits may be transmitted (e.g., via channel coding). Note that other numbers of subcarriers are possible.

Note that, although the techniques disclosed herein are primarily described with respect to designing a discovery message, they could also be applied to other types of messages. Generally, any type of message that could be transmitted in different subcarriers could be designed according to the techniques herein, e.g., in order to convey some information through subcarrier selection. Similarly, these techniques could also be applied in the time domain. In other words, a message that could be transmitted in any of multiple timeslots could use time slot selection (e.g., based on a slot index) in order to convey some of the payload information. Further, these techniques could be applied more generally to selecting a specific set of time/frequency resources among multiple possible sets of time/frequency resources. For example, a portion of the payload of a message may be carried based on (e.g., indicated by) a slot index and/or subcarrier index (or similar time/frequency indices) of the time/frequency resources used to carry the message (or, potentially a different message).

FIGS. 10-13—Message Mapping Via Frequency Indexing for Peer-To-Peer (P2P) Discovery FIGS. 10-13 illustrate examples and elements of possible device-to-device wireless communications using message mapping via frequency indexing, e.g., in the case of peer-to-peer (P2P) discovery, according to some embodiments.

Figures 10, 11, 12:
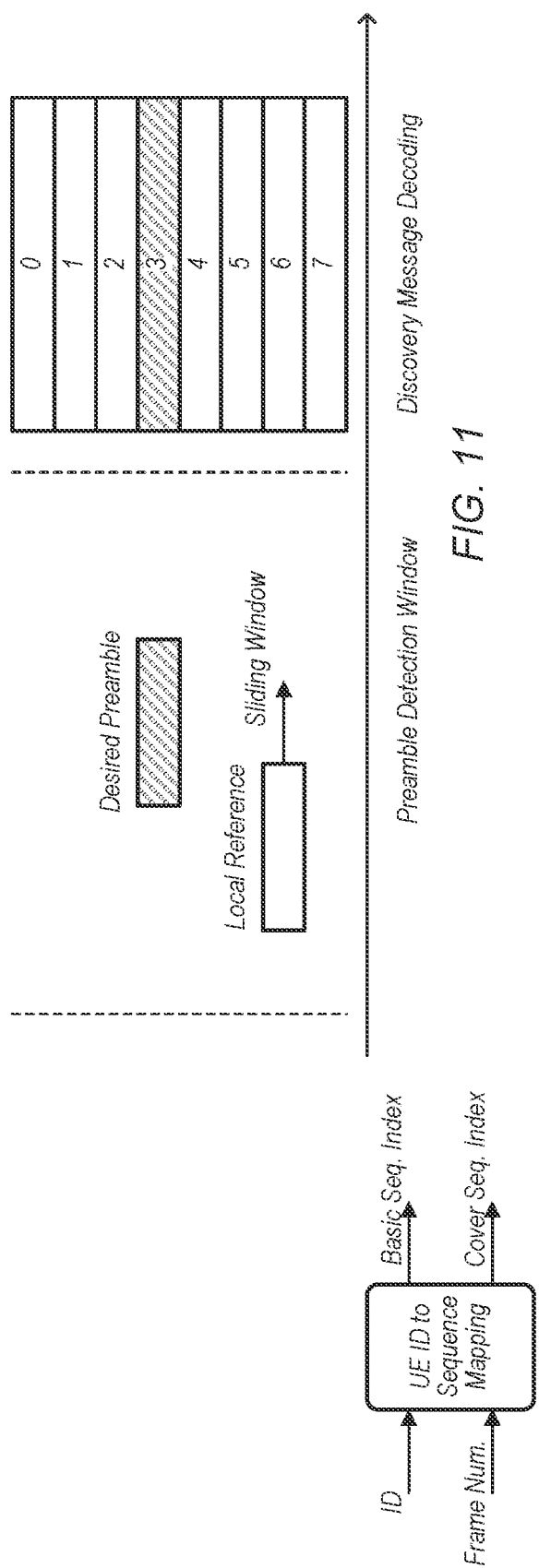
FIGS. 10-13 illustrate examples of possible device-to-device wireless communications using message mapping via frequency indexing in the case of peer-to-peer (P2P) discovery, according to some embodiments.

FIG. 10 illustrates a possible approach to generate synchronization preambles, e.g., particularly synchronization sequences, based on an ID (e.g., a DR ID and/or DI ID) and a frame number. For a given number of available preamble sequences (S), the preamble may carry log2(S) bits of the ID. Thus, if $N_{id}$ is the length of the ID expressed in binary, then floor(log2(S)) bits of the ID may be sent by preamble sequence, e.g., by detecting this particular sequence, the DR may know floor(log2(S)) bits in the ID. Further, floor(log2(K)) bits of the ID can be sent by subcarrier indexing (e.g., of the discovery message, as described above).

FIG. 11 illustrates a DR device monitoring for a sequence corresponding to its DR ID during a preamble detection window (e.g., sync preamble window, as described above with respect to FIG. 6). In response to detecting its local reference, e.g., sequence corresponding to its DR ID (e.g., in a desired sync preamble that describes part of the DR's DR ID), the DR may determine a subcarrier (e.g., k_active=3) on which to receive msg1 if the remainder of the DR ID were used to select the subcarrier. Based on receiving the discovery message on that subcarrier, the DR may determine that the discovery message is intended for its DR ID. Similarly, in the case illustrated by FIG. 12, a DR may detect a match to its local reference and determine a subcarrier. However, in this case, the DR ID that the DI uses to select the subcarrier may be a false alarm (e.g., a DR ID that shares the same preamble as the DR's DR ID), and the DR may detect the false alarm by observing that the discovery message is transmitted on a different subcarrier. In other words, a false alarm preamble (from the perspective of a specific DR) may be a preamble that could indicate its DR ID or at least one other DR ID. The DR may be able to differentiate between a false alarm (e.g., detecting a desired preamble followed by a discovery message on a subcarrier that does not correspond to its DR ID) and P2P discovery message intended for it (e.g., detecting the desired preamble followed by a discovery message on the subcarrier that does correspond to its DR ID).

Figure 13:
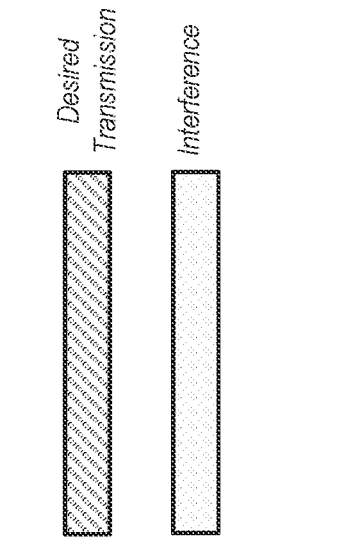

FIG. 13 illustrates five different cases for decoding the P2P discovery message, e.g., using the scenario of FIGS. 11-12. For further detail, assume the following parameter values: $N_{id}$=16 bits, $S=2^{13}$=8,192, $N=2^4$=16. Note that these values are illustrative only, and that other values are possible. Also note that although 16 subcarriers are used in the exemplary parameters, only 8 subcarriers are illustrated for convenience.

The DR may operate as follows. If the DR does not detect a preamble sequence corresponding to its local reference, it may skip the msg1 decoding. If the DR does detect a preamble sequence matching its local reference (which may be either desired/real or false alarm), it may monitor to receive msg1 on the calculated subcarrier. If a successful msg1 is decoded, it may assume that the preamble is real and not a false alarm, and it may interpret the bit fields of the msg1 accordingly. If no msg1 may be decoded correctly, it may determine that the preamble is a false alarm and discard the msg1. The criteria to determine successful decoding may be based on cyclic redundancy check (CRC) based on the DR ID in the discovery message.

In case 1301, the DR may detect the discovery message on the subcarrier corresponding to its DR ID, e.g., subcarrier 3, as in FIG. 11. In case 1302, the DR may also detect the discovery message on the subcarrier corresponding to its DR ID, however in this case interference may also occur on a different subcarrier (e.g., subcarrier 5). This interference on subcarrier 5 may be discarded, e.g., because the DR may know that a discovery message on any subcarrier other than subcarrier 3 is not relevant to it. In case 1303, both a desired transmission (e.g., a discovery message with the correct DR ID) and interference (e.g., some other transmission, such as a discovery message with a different DR ID) may occur on subcarrier 3. The DR may detect these transmissions, and may or may not be able to successfully decode the discovery message with the correct DR ID. In other words, the interference on subcarrier 3 may be relevant because it may interfere with the DR's ability to decode the discovery message intended for it. Case 1304 may be similar to case 1303, with the addition of additional interference on subcarrier 5. The additional interference may not be relevant, e.g., because the DR can disregard this interference as it is not on subcarrier 3. In case 1305, the DR may detect interference on subcarrier 3, and may discard this transmission, e.g., based on the CRC.

FIGS. 14-17—Message Mapping Via Frequency Indexing for Presence Discovery

Figure 16:
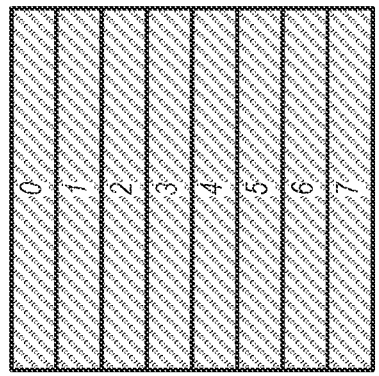
FIGS. 14-17 illustrate examples of possible device-to-device wireless communications using message mapping via frequency indexing in the case of presence discovery, according to some embodiments.
Figure 15:
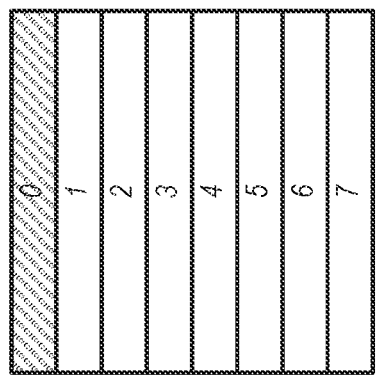
Figure 14:
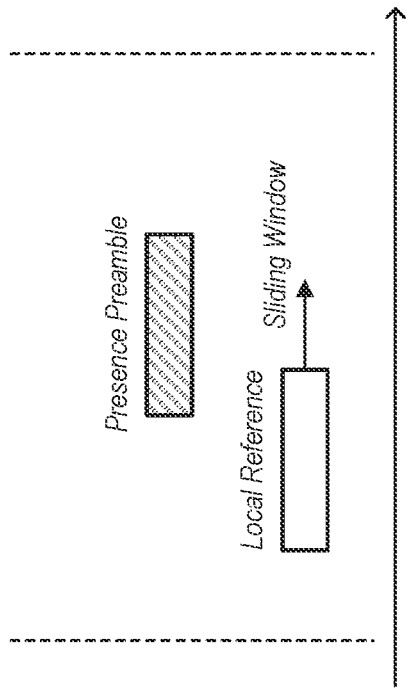

FIGS. 14-17 provide additional information about presence discovery. Similar to FIGS. 11 and 12, FIG. 14 illustrates a DR monitoring its local reference during a preamble detection window. However, in this case, it may detect a common presence preamble (e.g., which may be associated with its local reference in addition to a preamble that corresponds to its DR ID). For example, in presence discovery, the entire presence ID may be associated with the preamble. Thus, all receiving DRs may know based on the sync preamble that the discovery message is intended for all DRs. Therefore, the discovery message may be able to include other information, e.g., the DI ID. In some embodiments, the DR may only monitor a single subcarrier (e.g., as shown in FIG. 15), and thus no message payload may be offloaded based on subcarrier indexing. In some embodiments, e.g., as shown in FIG. 16, the DR may be able to monitor all subcarriers, and thus information may be offloaded based on subcarrier indexing. For example, floor (log2(K)) bits of the DI ID, e.g., MSB or LSB may be offloaded. Alternatively, floor(log2(K)) bits of other information associated with the discovery message payload may be offloaded.

Figure 17:
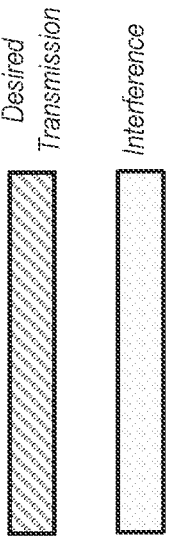

FIG. 17, similar to FIG. 13, illustrates different cases for decoding the presence discovery message, in the case that the DR is able to (e.g., allowed to) receive all available subcarriers at the same time (as in FIG. 16). Again, assume $N=2^4$=16, however only 8 subcarriers are illustrated for convenience. Further, assume that 4 bits (e.g., MSB) of DI ID is used to select the subcarrier of msg1 (e.g., an offloaded portion may be 4 bits). The DR may operate as follows: If the DR does not detect a preamble sequence corresponding to its local reference (e.g., the presence preamble sequence), it may skip the msg1 decoding. If the DR does detect the presence preamble (which may be either desired/real or false alarm), it may monitor to receive msg1 on all available subcarriers. Thus, interference on all (e.g., any) available subcarriers may be relevant. If a successful msg1 is decoded on one subcarrier, it may interpret the bits carried by the position (e.g., subcarrier index) accordingly and may further decode and interpret the bit fields in the msg 1. If no msg1 may be decoded correctly, it may determine that the preamble is a false alarm and discard the msg1. The criteria to determine successful decoding may be based on CRC, e.g., using the presence ID, in the discovery message.

In case 1701, the DR may detect the discovery message e.g., on subcarrier 3. The DR may interpret the 4 bits of the MSB of the DI ID based on the selection of subcarrier 3. Thus, the DR may know the entire DI ID based on the combination of the received (non-offloaded) portion of msg1 in combination with the identity of the subcarrier (e.g., subcarrier 3). In case 1702, the DR may also detect the discovery message corresponding the common presence ID (illustrated in subcarrier 3, but other subcarriers are possible), however in this case interference may also occur on a different subcarrier (e.g., subcarrier 5). This interference on subcarrier 5 may be relevant, but may be discarded, e.g., because it may not pass a CRC redundancy check (e.g., it may not correspond to the common presence ID). In case 1703, both a desired transmission (e.g., a discovery message with the common presence ID) and interference (e.g., some other transmission, such as a P2P discovery message with a different DR ID) may occur on subcarrier 3. The DR may detect these transmissions, and may or may not be able to successfully decode the discovery message with the common presence ID. Case 1704 may be similar to case 1703, with the addition of additional interference on subcarrier 5. The additional interference may also be relevant. In case 1705, the DR may detect interference on subcarrier 3, and may discard this transmission, e.g., based on the CRC.

Figure 18:
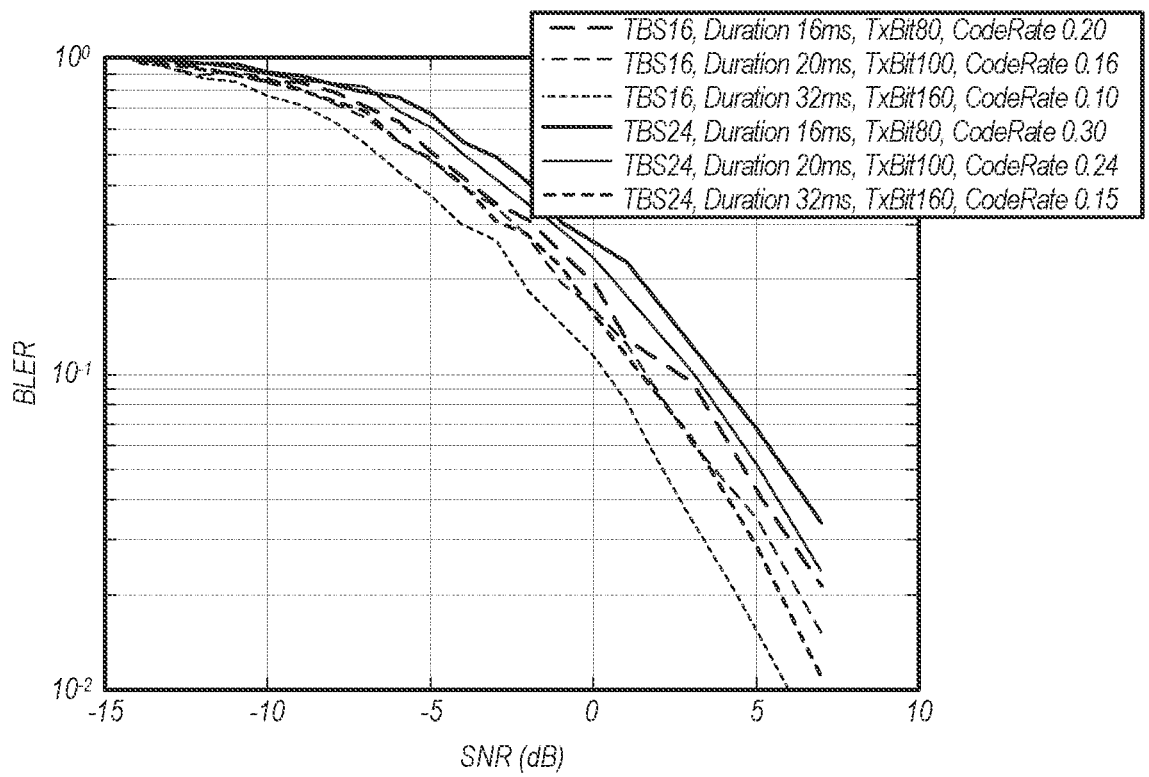
FIGS. 18-19 illustrate examples of possible benefits of reducing discovery message payload, according to some embodiments.
Figure 19:
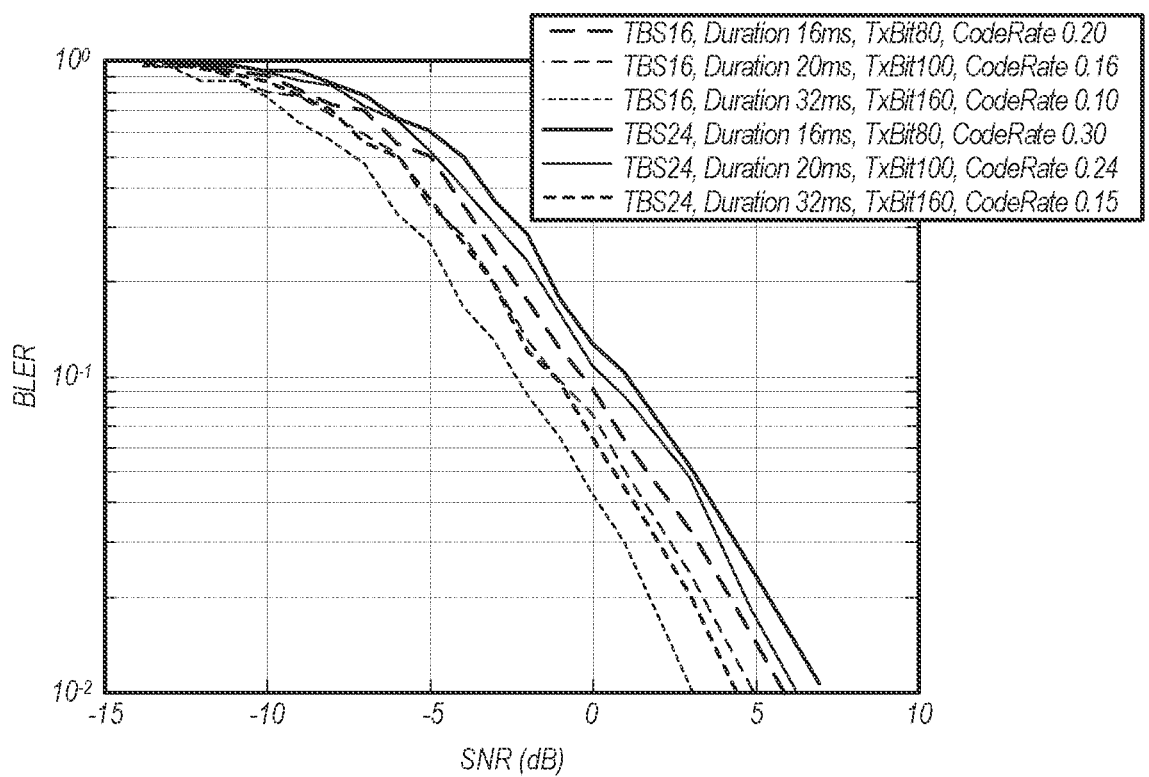

FIGS. 18-19 Benefits of Offloading a Portion of a Message Via Frequency Indexing FIGS. 18 and 19 depict exemplary possible benefits of offloading a portion of a message via frequency indexing. In some embodiments, by reducing the amount of payload transmitted by channel coding, the decoding performance may be improved due to a lower code rate. In other words, conveying some of the payload information via subcarrier selection allows a lower code rate to be used to transmit the remaining payload information, e.g., given the same amount of time/frequency resources. As shown, block error rate (BLER) increases as signal to noise ratio (SNR) decreases. However, for lower code rates, the BLER is better (e.g., lower) for any given SNR. This effect may be observed in both an EPA5Medium channel (FIG. 18) and an EPA5Low channel (FIG. 19). Note that the illustrated results are exemplary and other results may be possible.

Figure 20:
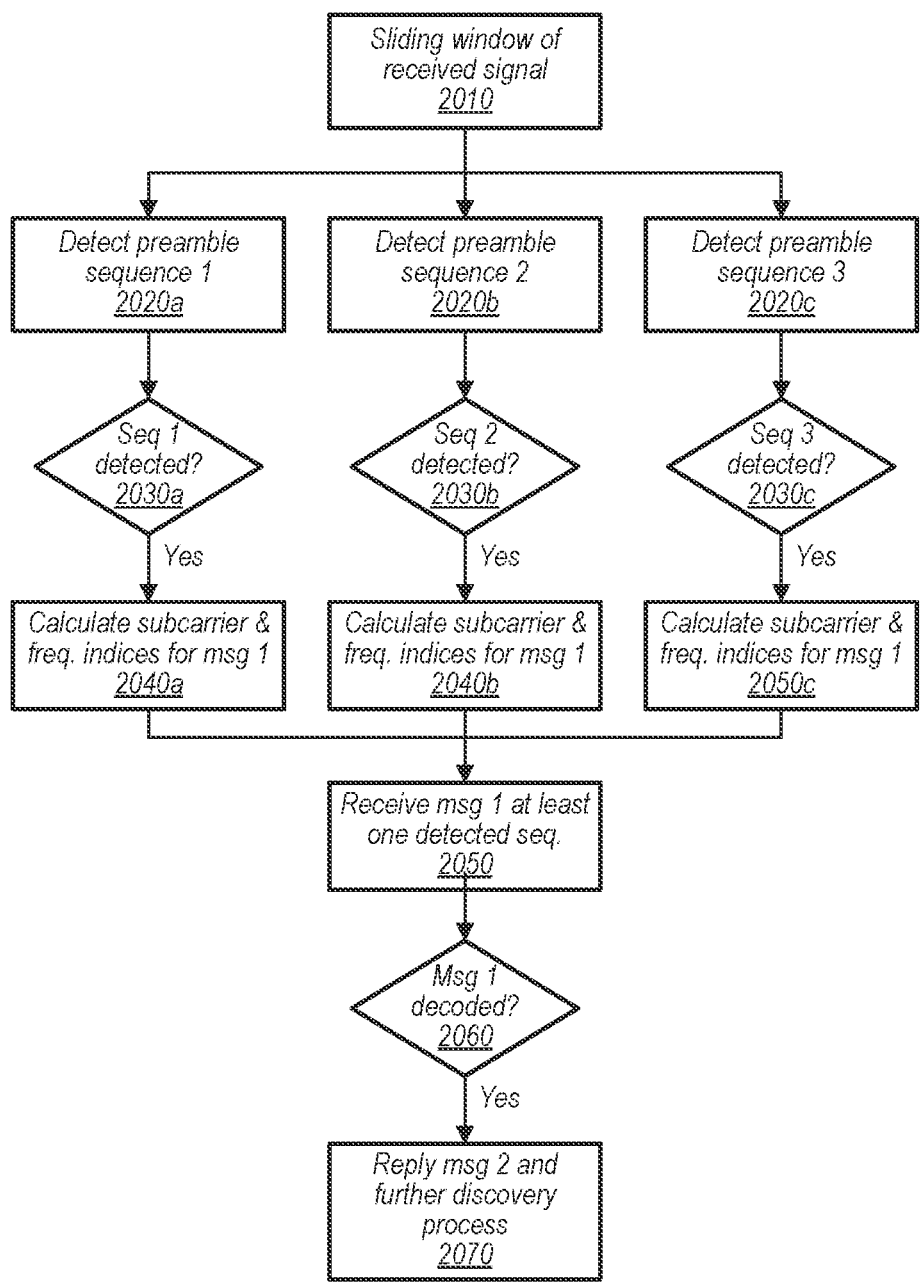
FIG. 20 illustrates a method for operating a receiving device, according to some embodiments.

FIG. 20—Method of a Discovery Receiver (DR)

FIG. 20 illustrates an exemplary method of a discovery receiver (DR) monitoring a local reference. As shown, the DR may monitor one or more subcarriers or channels for received signals (e.g., preambles) matching its local reference during a sliding window (2010). In particular, in the illustrated example, the device may monitor the one or more subcarriers or channels for synchronization sequences 1, 2, and 3 (2020a-2020c, respectively). Note that the device may monitor for any number of synchronization sequences, according to some embodiments. In response to detecting a preamble matching its local reference (2030a-2030c), the DR may calculate (e.g., determine) subcarrier and frequency indices to monitor for a discovery message, e.g., msg1 (2040a-2040c). The DR may receive a discovery message (2050), which may be associated with at least one of the detected synchronization sequences. Note that more than one discovery message may be received, according to some embodiments. In response to successfully decoding the discovery message(s) (2060), the DR may determine the complete payload of the message (e.g., potentially including by determining an offloaded portion of the payload based on the frequency index on which the message was received), and may reply with msg2 and continue the discovery process (2070).

Figure 21:
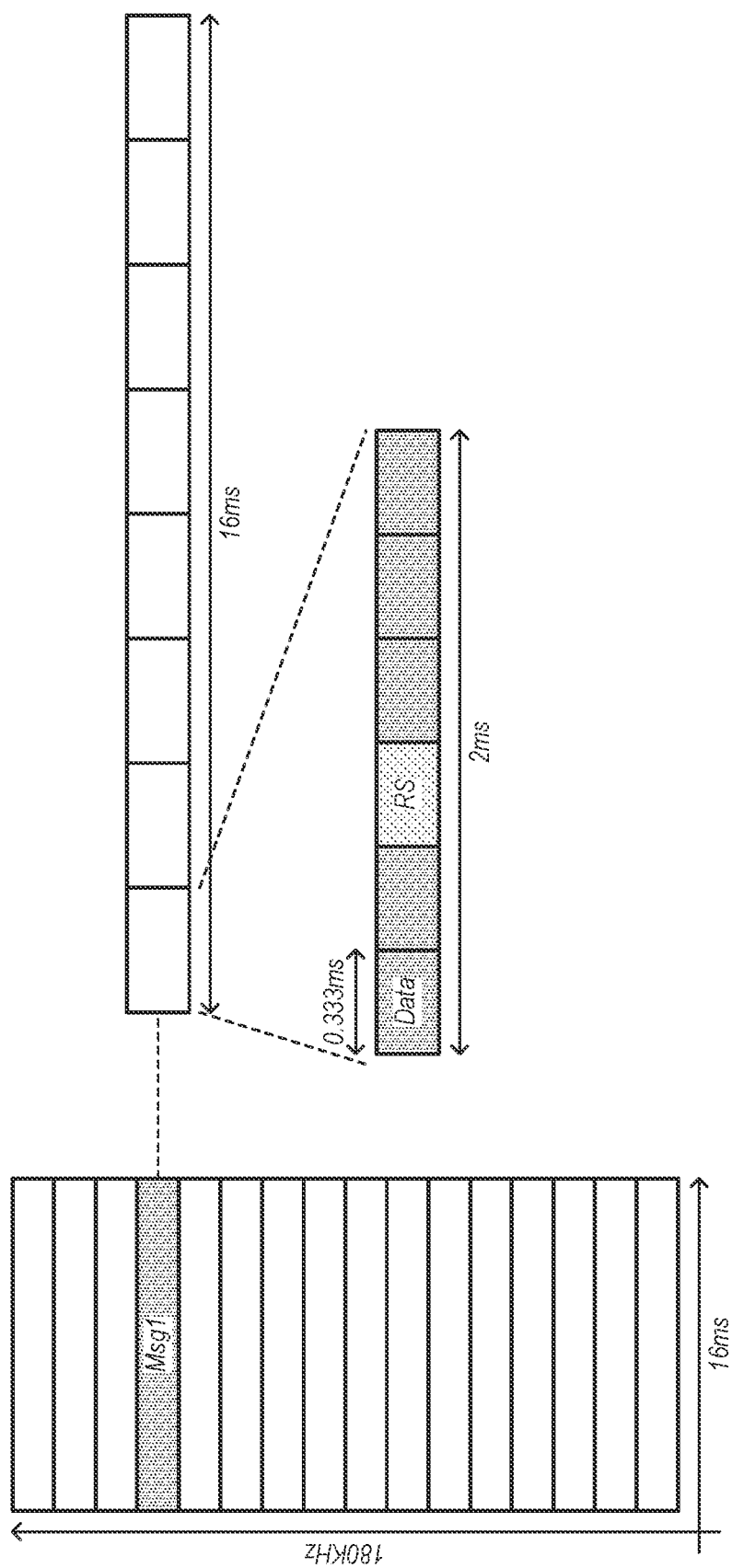
FIG. 21 illustrates an exemplary design of a discovery message, according to some embodiments.

FIG. 21—Design of a Discovery Message

FIG. 21 illustrates an exemplary design of a discovery message (e.g., msg 1), according to some embodiments. As shown there may be 16 available subcarriers, at a spacing of 3.75 KHz, among various possibilities. For example, there may be a total of 48 subcarriers at a 180 KHz bandwidth, among various possibilities. In some embodiments, the discovery message may have a duration of 16 ms. The 16 ms duration may comprise 8 slots (e.g., each with a 2 ms duration), and each slot may include 5 data symbols and 1 reference symbol (RS), among various possibilities. Thus, a total of 80 bits (e.g., 2 bits/data symbol*5 data symbols/slot*8 slots=80 bits) may be available for transmission. In the case of P2P discovery, for example, the payload of the discovery message may be a 16 bit DI ID, e.g., without a cyclic redundancy check (CRC). Therefore, the coding rate may be 0.2 (e.g., 16/80=0.2). In some embodiments, the DI ID may be uniquely mapped by the preamble sequence and frequency/subcarrier index. For example, if 4 bits of the DI ID are offloaded, the coding rate may be 0.15 (e.g., (16−4)/80=0.15). Similarly, in the case of presence discovery, the payload may be a 16 bit DR ID (e.g., a common/presence ID), which may similarly be offloaded based on frequency indexing. Such mapping (e.g., offloading) may allow for a lower coding rate to be used for the discovery message. Decoding of the DI (e.g., or DR) ID in the message may be validated, e.g., by a friend-list check. In other words, the receiver may compare the decoded ID to a list of expected (e.g., possible) IDs for validation. In some embodiments, the discovery message may be transmitted using quadrature phase shift keying (QPSK) and LTE tail-biting convolutional code (TBCC). Other types of channel coding (e.g., polar coding, turbo coding, etc.) may also be used.

Figure 22:
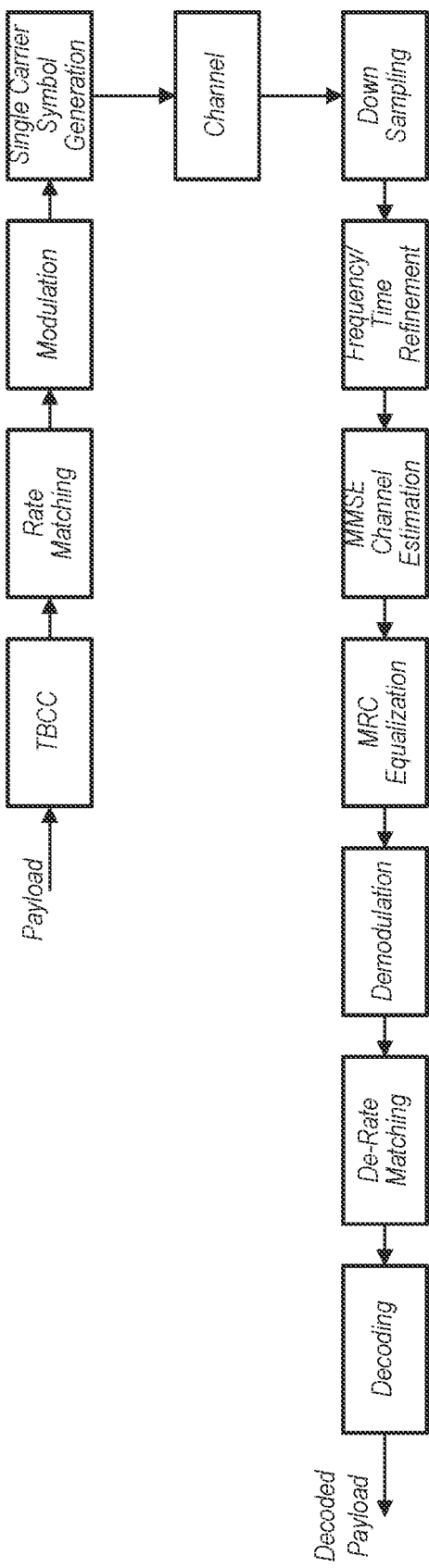
FIG. 22 illustrates a method for coding and decoding a discovery message, according to some embodiments.

FIG. 22—Process for Transmitting and Receiving a Message

FIG. 22 is a flow chart depicting an exemplary process for transmitting and receiving a message, e.g., the discovery message of FIG. 21. This exemplary process may be consistent, e.g., broadly speaking, with the simulation results portrayed in FIGS. 25-53 and discussed below. Note that several of FIGS. 25-53 may include various deviations, e.g., in various details, from the exemplary process.

Aspects of the method of FIG. 22 may be implemented by a wireless device, such as the UEs 106 illustrated in and described with respect to FIGS. 1-3, or more generally in conjunction with any of the computer systems or devices shown in the Figures, among other devices, as desired. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. For example, a processor (and/or other hardware) of a device may be configured to cause the device to perform any combination of the illustrated method elements and/or other method elements. As shown, the method may operate as follows.

In some embodiments, a payload may be encoded using TBCC (or other coder), e.g., by a DI device. The encoded payload may be rate matched and modulated. Symbols may be generated for a carrier (e.g., or multiple carriers). The symbols may be transmitted (e.g., by the DI device) on a channel.

The symbols may be received and downsampled (e.g., by a DR device) from the channel. The DR device may perform frequency and/or time refinement and may perform channel estimation (e.g., minimum mean squared error (MMSE)). The received signal may be equalized (e.g., maximum-ratio combining (MRC)), demodulated, de-rate matched, and decoded. The decoded payload may be interpreted by the DR device (e.g., ID information from the payload may be determined).

Figure 23:
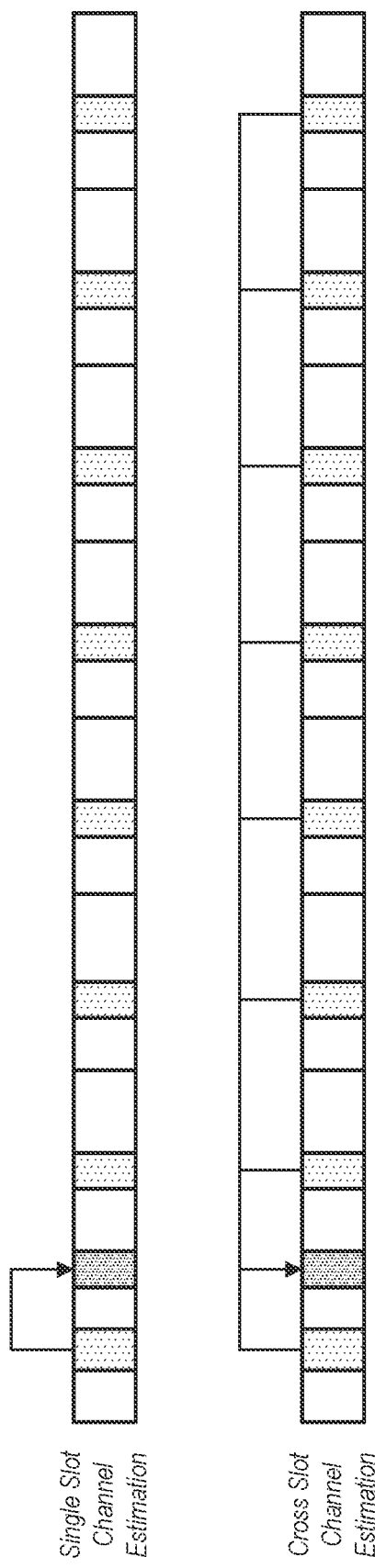
FIG. 23 illustrates exemplary channel estimation techniques, according to some embodiments.

FIG. 23—Single Slot vs Cross Slot Channel Estimation

FIG. 23 illustrates single slot vs cross slot channel estimation techniques. Channel estimation may be a significant factor for decoding performance. As shown, in cross slot channel estimation, multiple reference symbols (RS) may be used to estimate the channel. However, in single slot channel estimation, only a single reference symbol may be used. With single slot MMSE channel estimation, RS may have the same SNR as data symbol, and thus may degrade the performance. With cross-slot MMSE channel estimation, SNR of RS may be significantly improved (e.g., depending on Doppler spread) and thus may improve the decoding performance.

Figure 24:
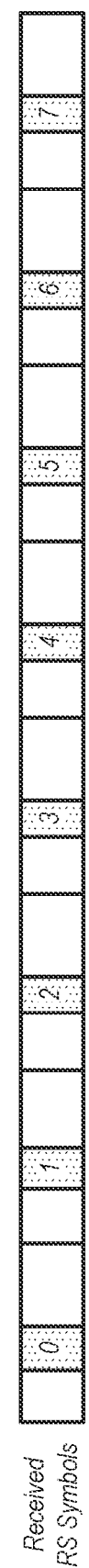
FIG. 24 illustrates exemplary carrier frequency refinement techniques, according to some embodiments.

FIG. 24—Reference Signal

FIG. 24 illustrates received RS, e.g., as may be used for carrier frequency refinement (e.g., CFO refinement). Denote received signal at RS symbol k as s_k, then angle(conj(s_(k−1))*s_k) may be equal to $2*pi*F_{error}*T_{delta}$, where $F_{error}$ is carrier frequency residual error, and $T_{delta}$ is the time delta between two adjacent DMRS symbol.

In some embodiments, single tap CFO refinement may be performed as follows. A sum may be calculated over different DMRS, e.g.,: P1=sum_k(conj(s_(k−1))*s_k) for each of the antenna signal. P1 may be summed over the two antennas. $F_{error}$ may be estimated as: $F_{error}$_est=angle (P1_sum)/($2*pi*T_{delta}$).

In some embodiments, multiple-tap CFO refinement may be performed as follows. A sum may be calculated over different DMRS with different lags: Pi=sum_k (conj(s_(k−i))*s_k) for each of the antenna signal, where i=1 to 4. Pi may be summed over the two antennas, where i=1 to 4. Pi may be combined (e.g., and weighted), e.g.,: P=sum(w_i*Pi), where w_i is filter coefficient can be optimized. $F_{error}$ may be estimated, e.g., $F_{error\_est}$=angle(P)/ ($2*pi*T_{delta}$).

FIGS. 25-53

Figure 25:
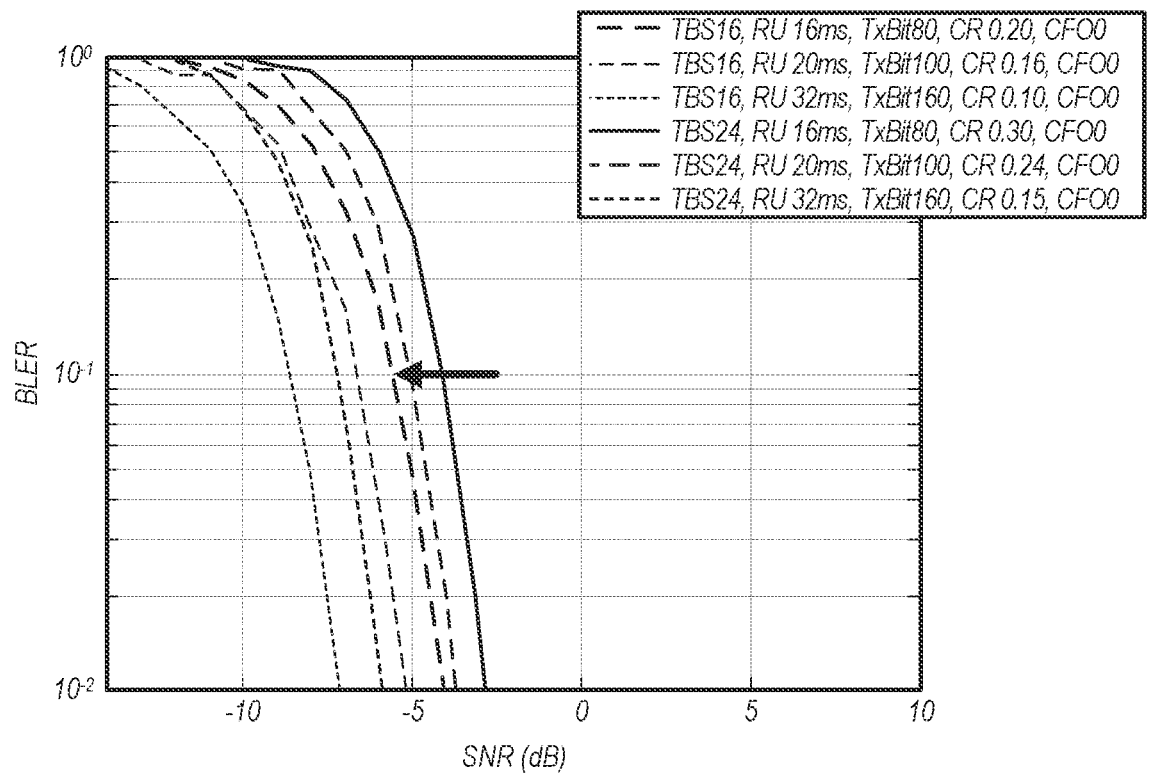
FIGS. 25-53 illustrate exemplary simulation results, according to some embodiments.
Figure 26:
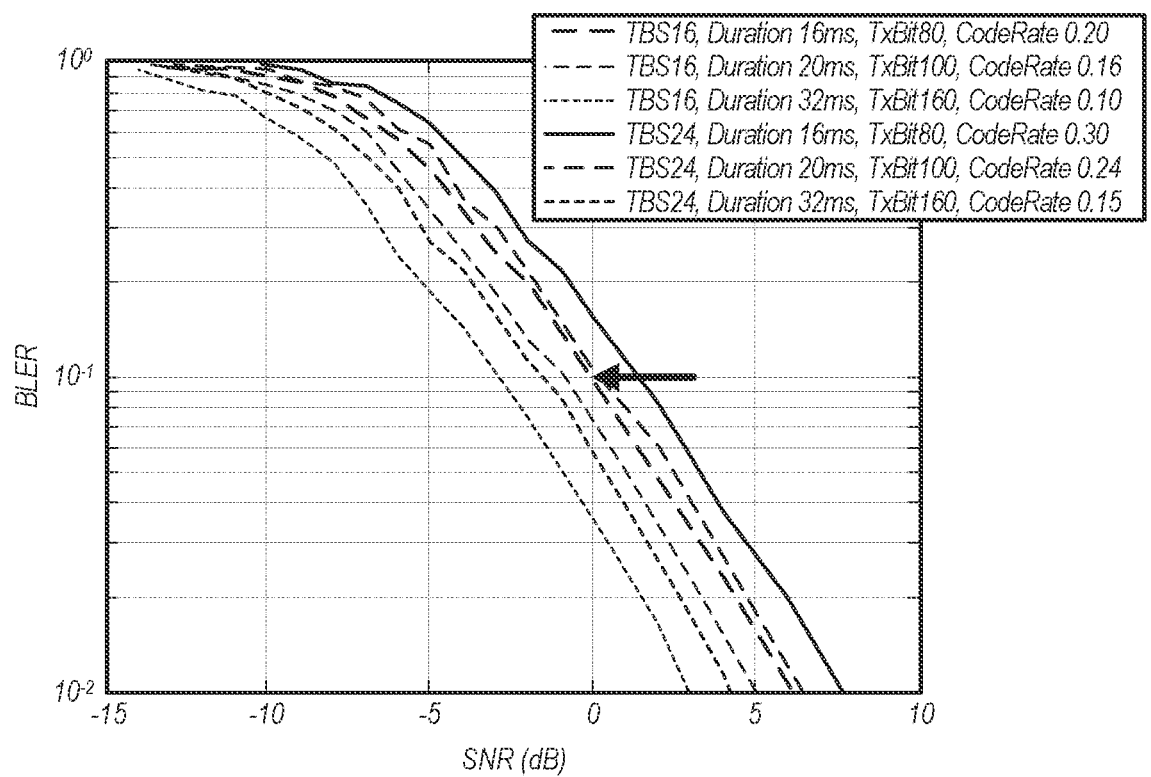
Figure 27:
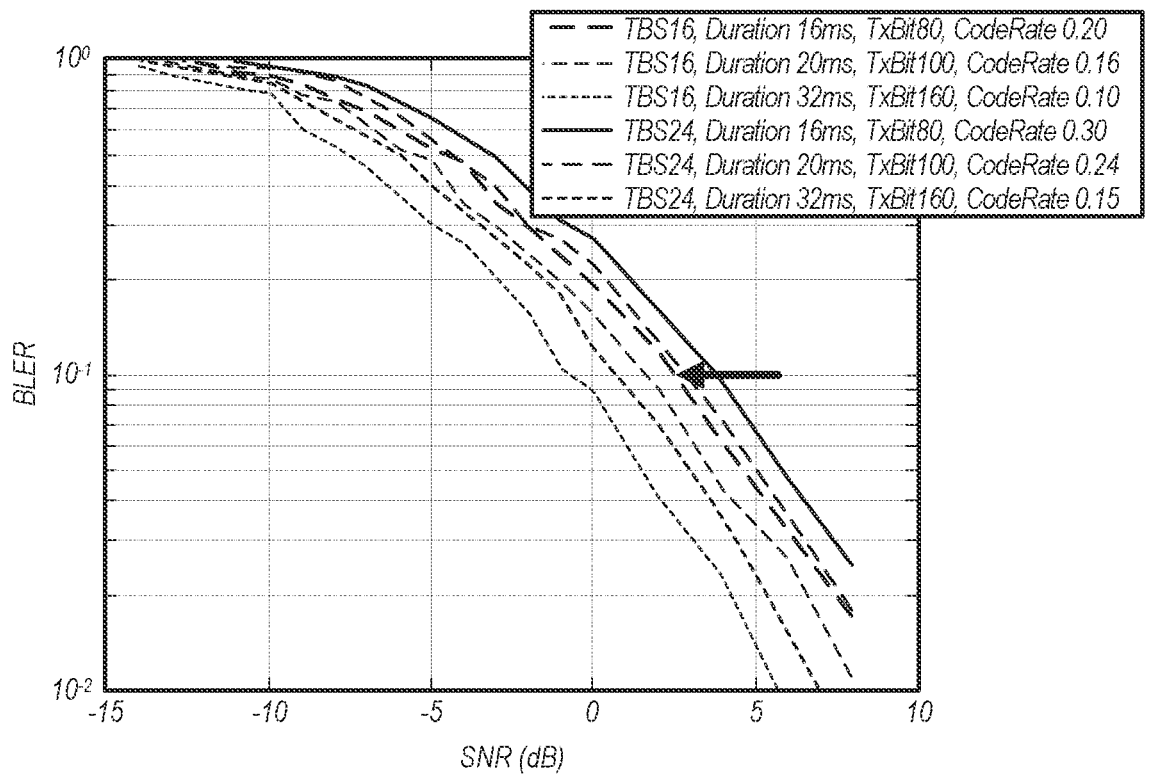
Figure 28:
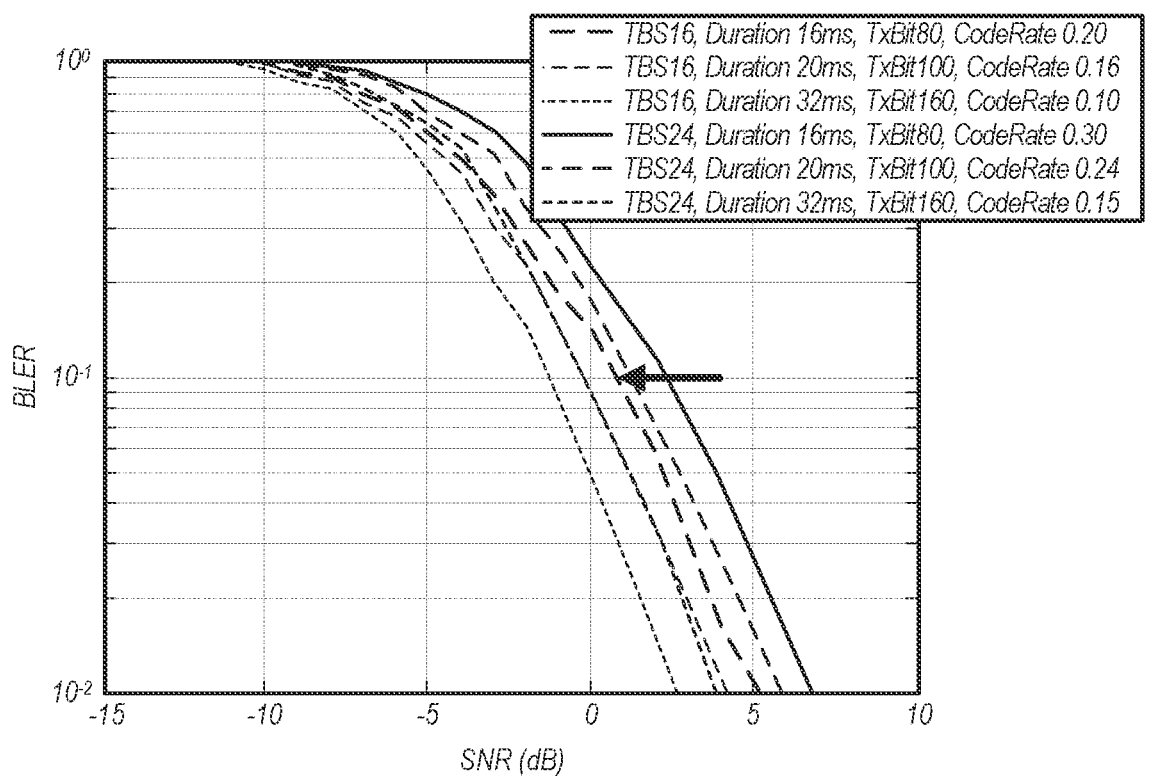
Figure 29:
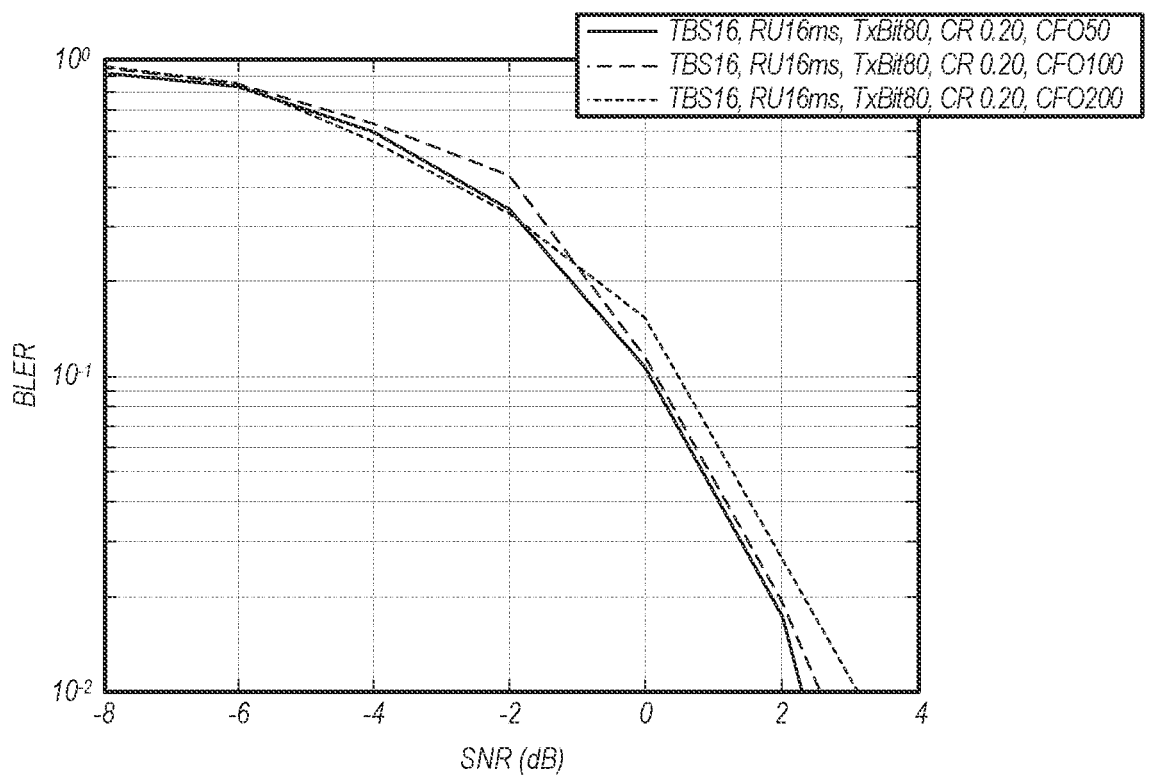
Figure 30:
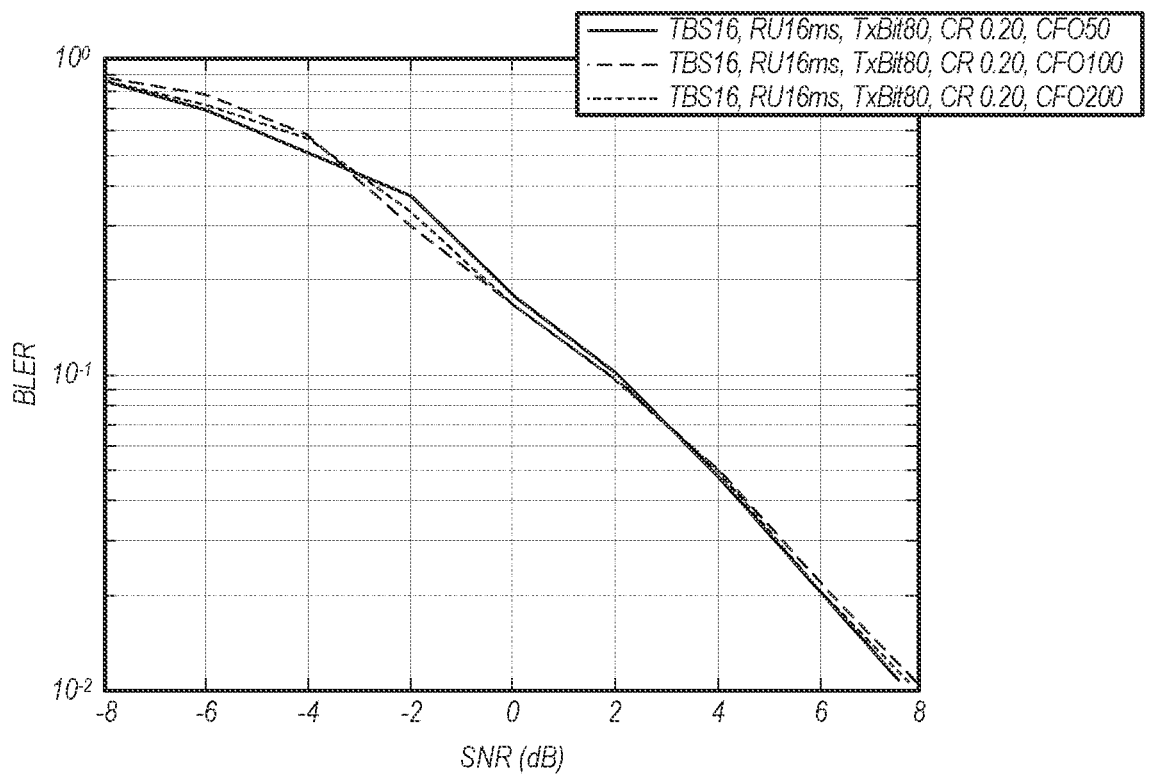
Figure 31:
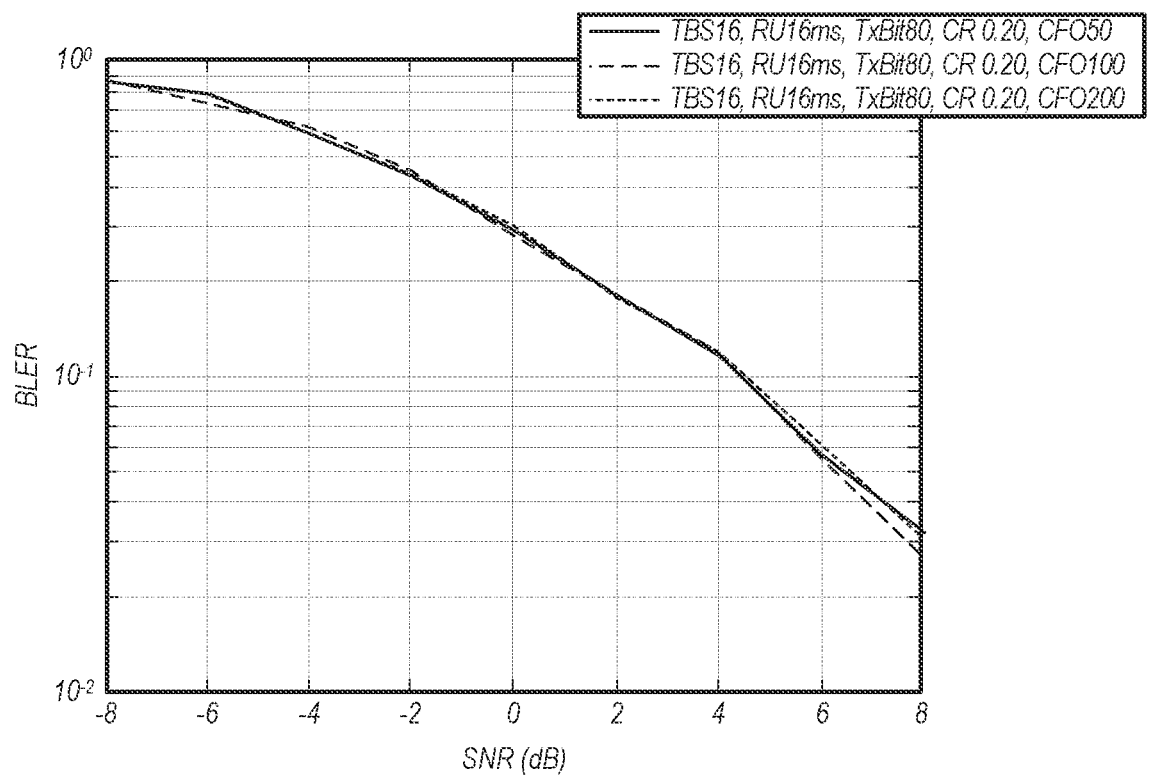
Figure 32:
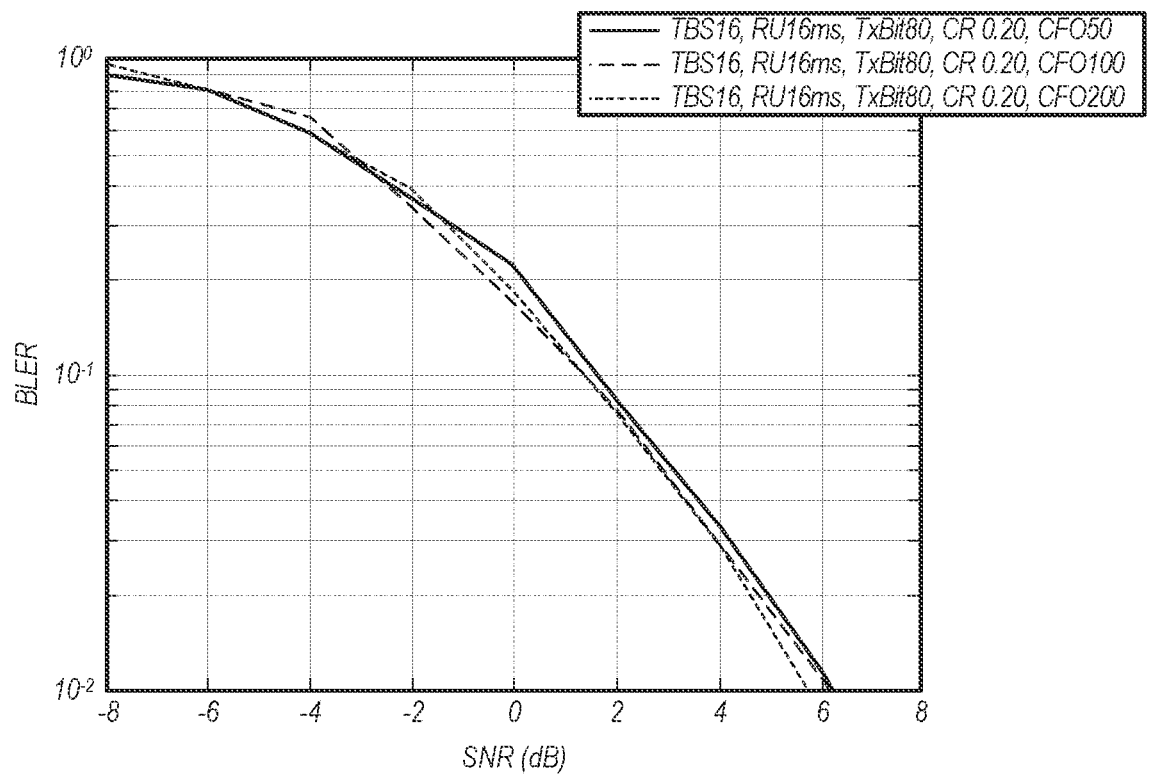

FIGS. 25-28 illustrate exemplary simulated results, e.g., estimates of block error rate (BLER) as a function of signal-to-noise ratio (SNR) for various code rates, e.g., using different channel models. FIG. 25 illustrates the results using an additive white Gaussian noise (AWGN) channel model. FIG. 26 uses an Extended Pedestrian A (EPA) 5 low model. FIG. 27 uses an EPA 5 medium model. FIG. 28 uses an Extended Vehicular A (EVA) 30 low model.

FIGS. 29-32 illustrate further exemplary simulated results, including the effect of carrier frequency offset (CFO) estimation. The CFO residual may be uniformly distributed (e.g., [−max CFO, +max CFO]). There may be degradation with residual error in CFO refinement. These figures use the same channel models as FIGS. 25-28.

Figure 33:
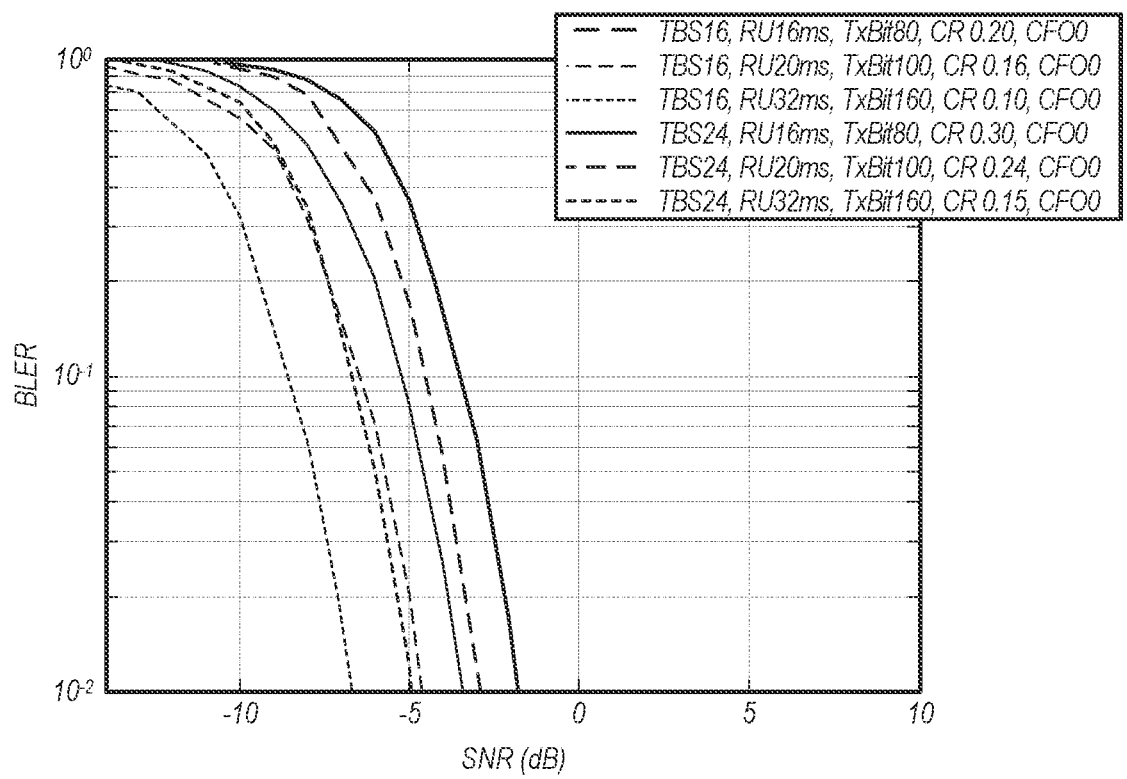
Figure 34:
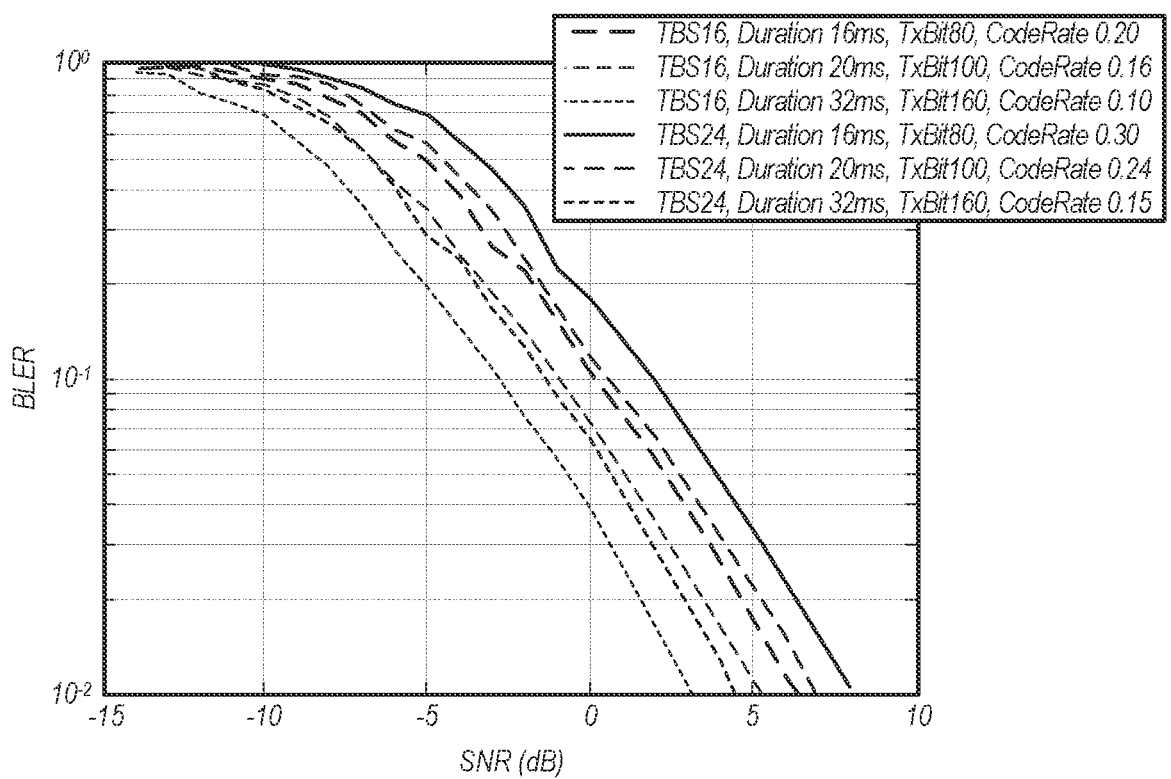

FIGS. 33 and 34 illustrate further exemplary simulated results, using polar coding techniques. FIG. 33 may use the AWGN model and FIG. 34 may use the EPA 5 low model.

Figure 35:
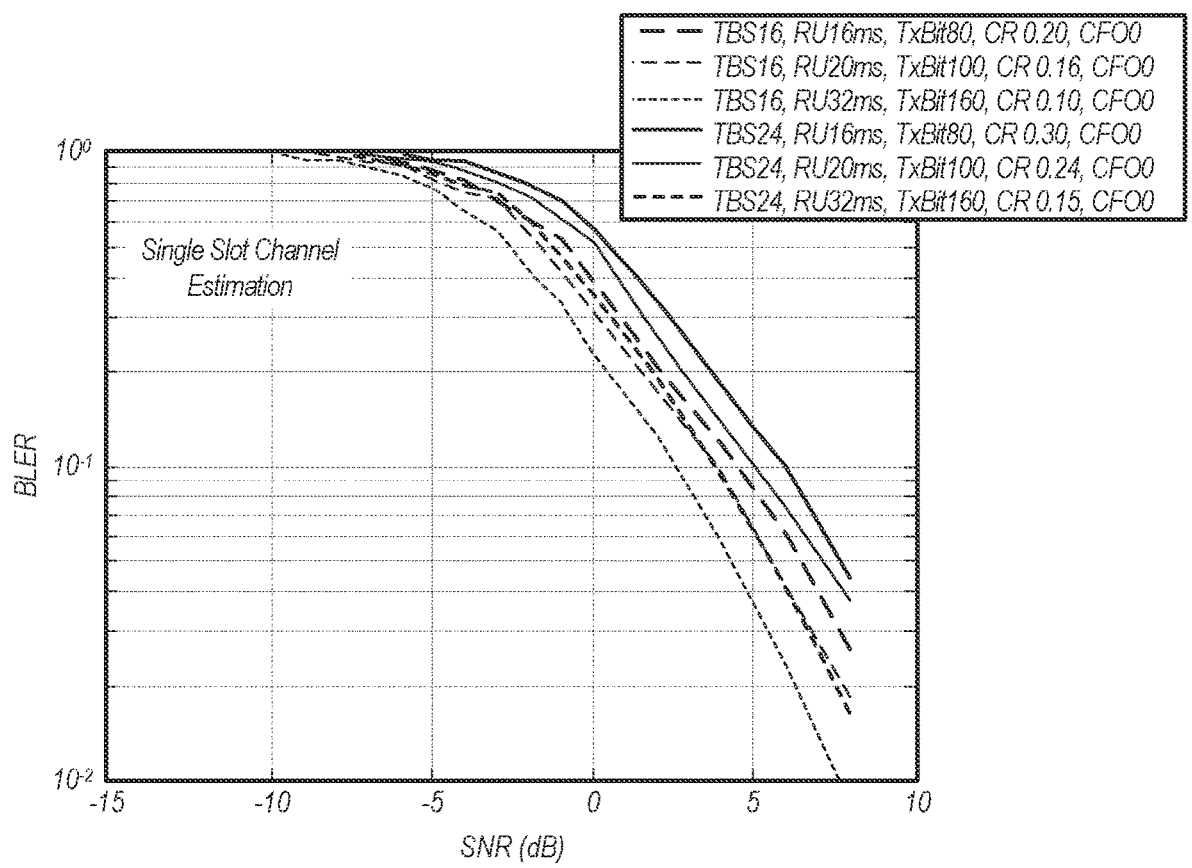

FIG. 35 illustrates the effects of single slot channel estimation. FIG. 35 may be compared to FIG. 33, e.g., which uses cross slot channel estimation for the same simulation. Notably, the results illustrated in FIG. 35 may represent approximately a 4 dB loss relative to the results of FIG. 33.

Figure 36:
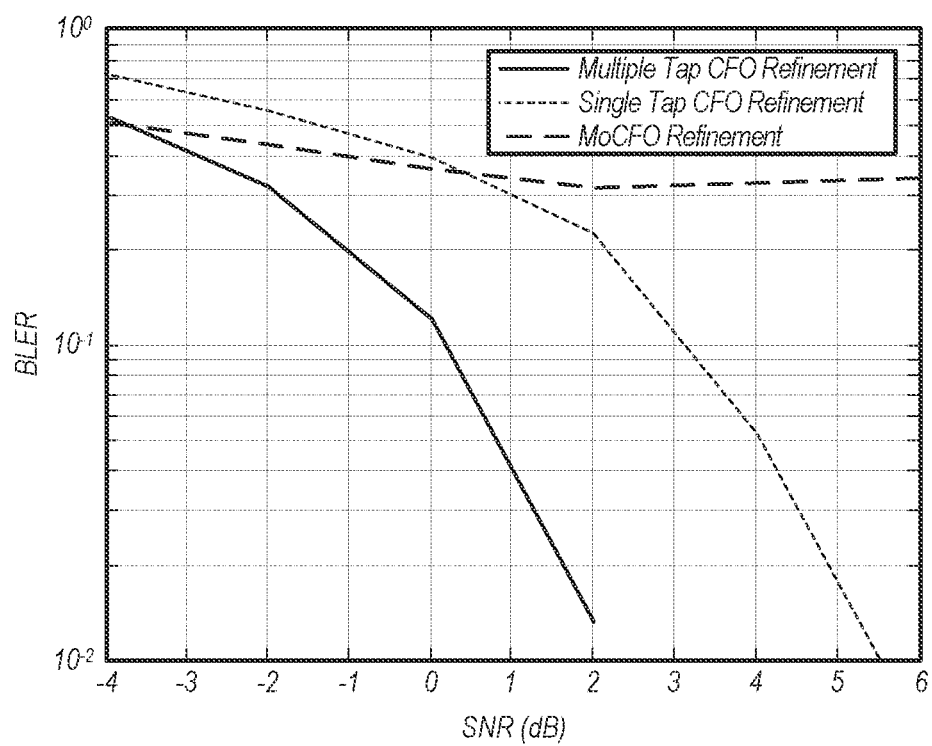
Figure 37:
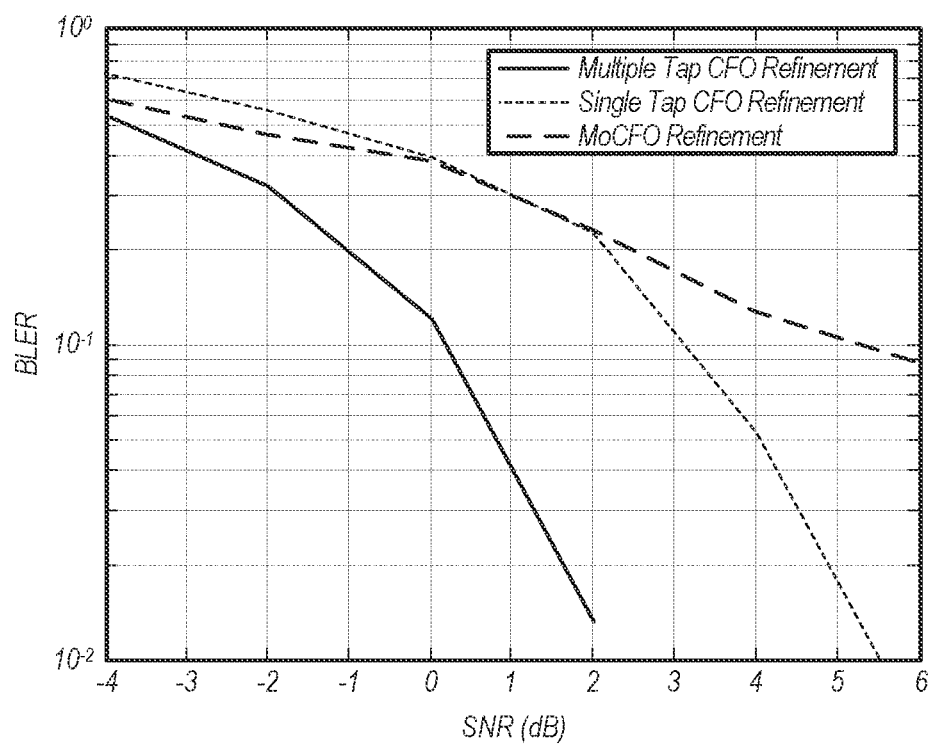

FIGS. 36 and 37 illustrate further exemplary simulated results, including the effect of different levels of CFO refinement. As illustrated, without CFO refinement, BLER may be limited by an error floor and multi-tap may provide a significant gain over single tap. Further optimization may be possible, e.g., via one or more of: maximum ratio combining of Rx signal (instead of equal gain combining) or optimizing filter coefficients.

Figure 38:
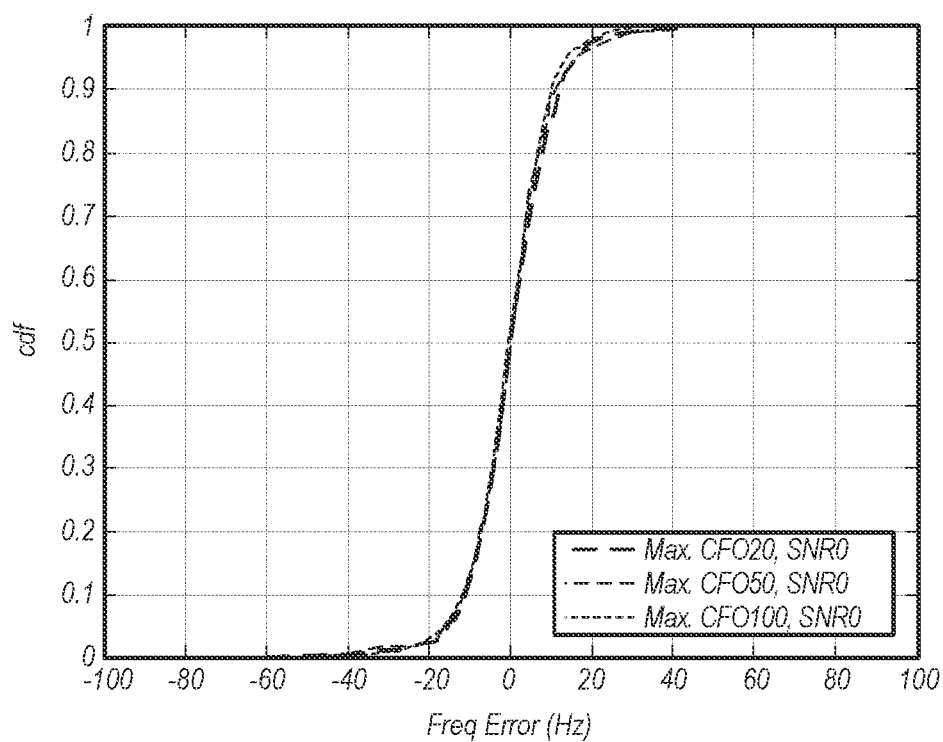
Figure 39:
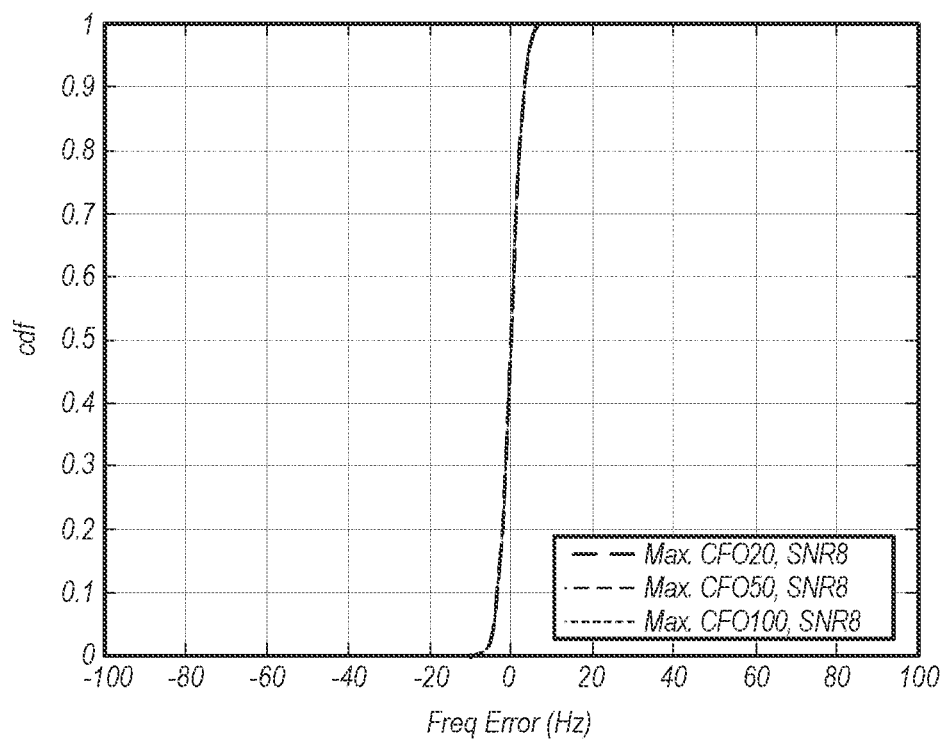
Figure 40:
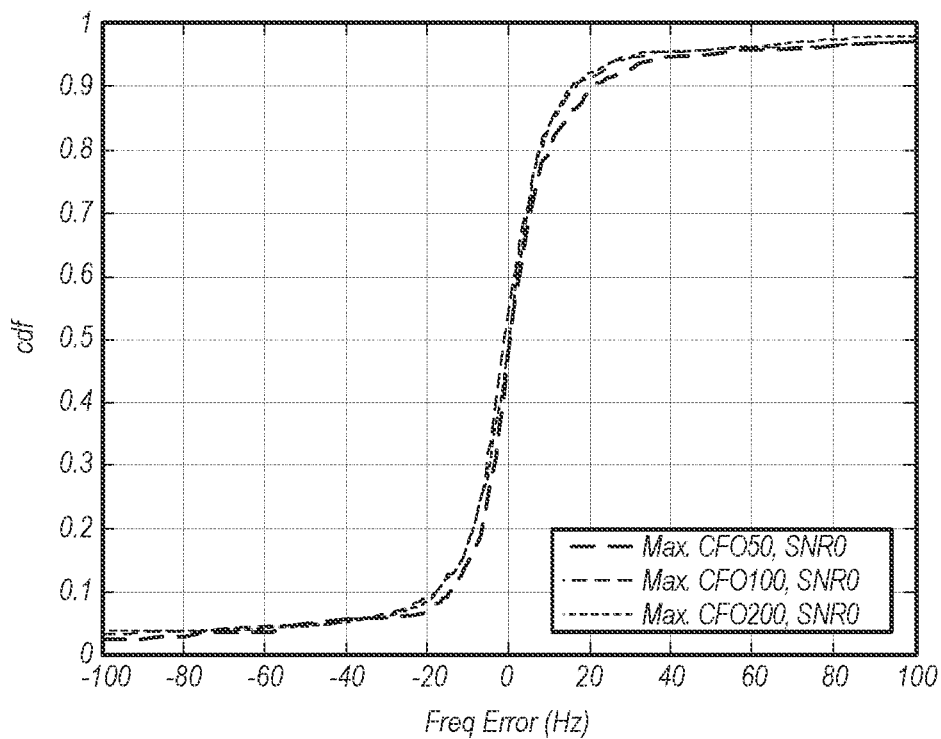
Figure 41:
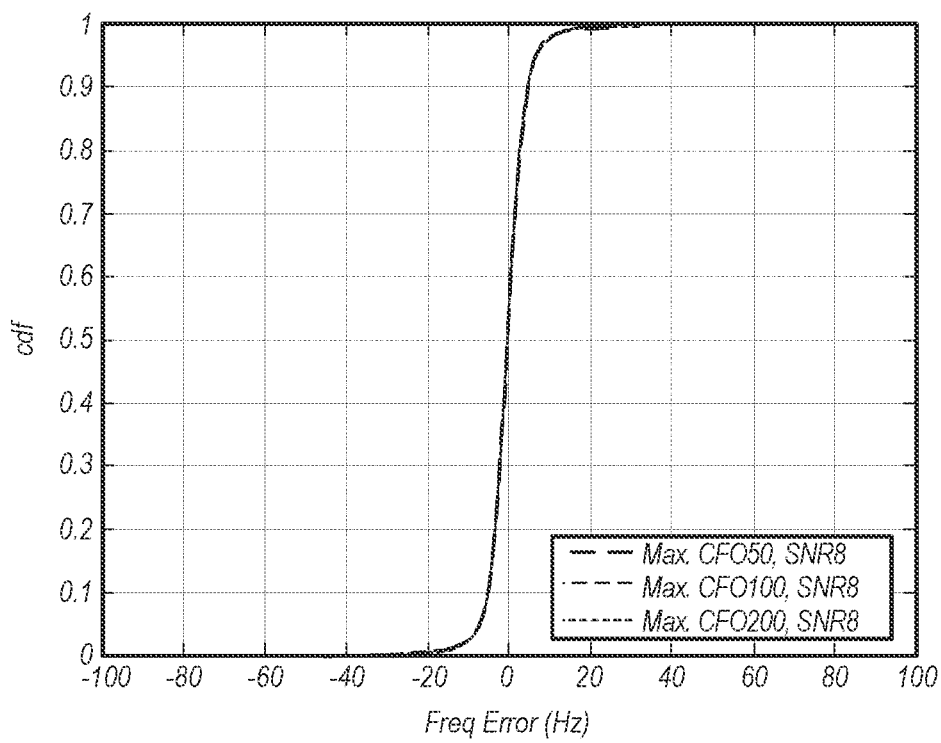
Figure 42:
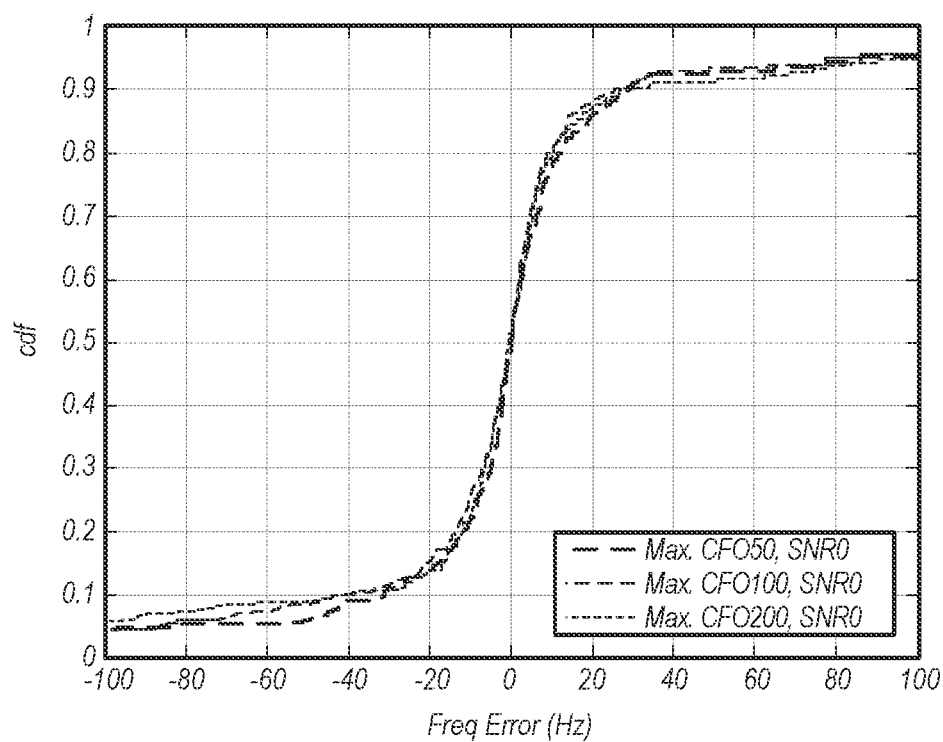
Figure 43:
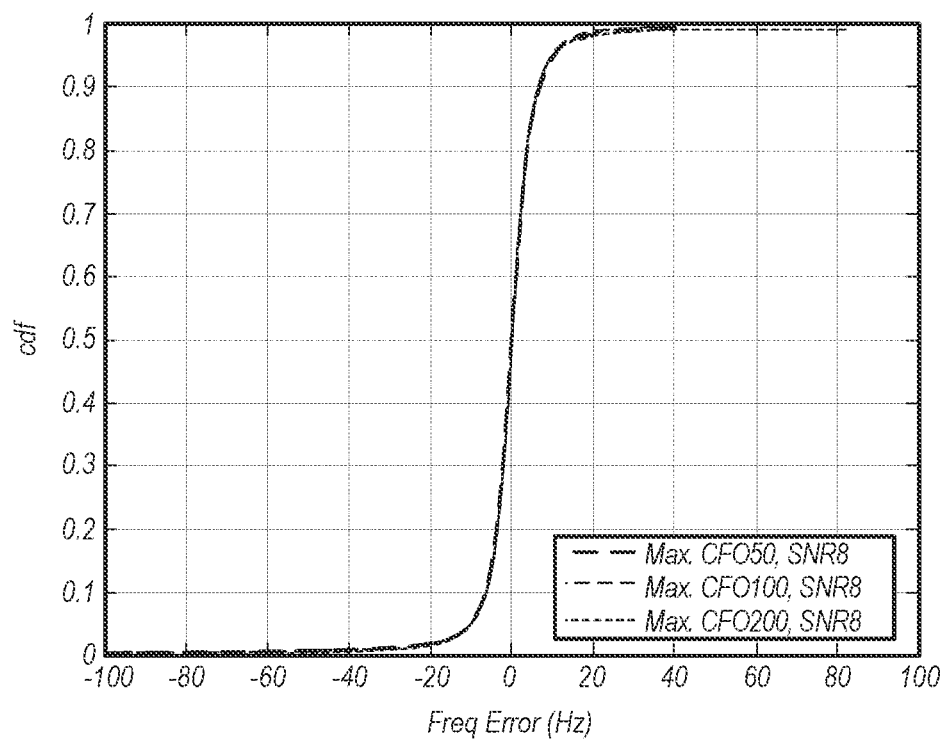
Figure 44:
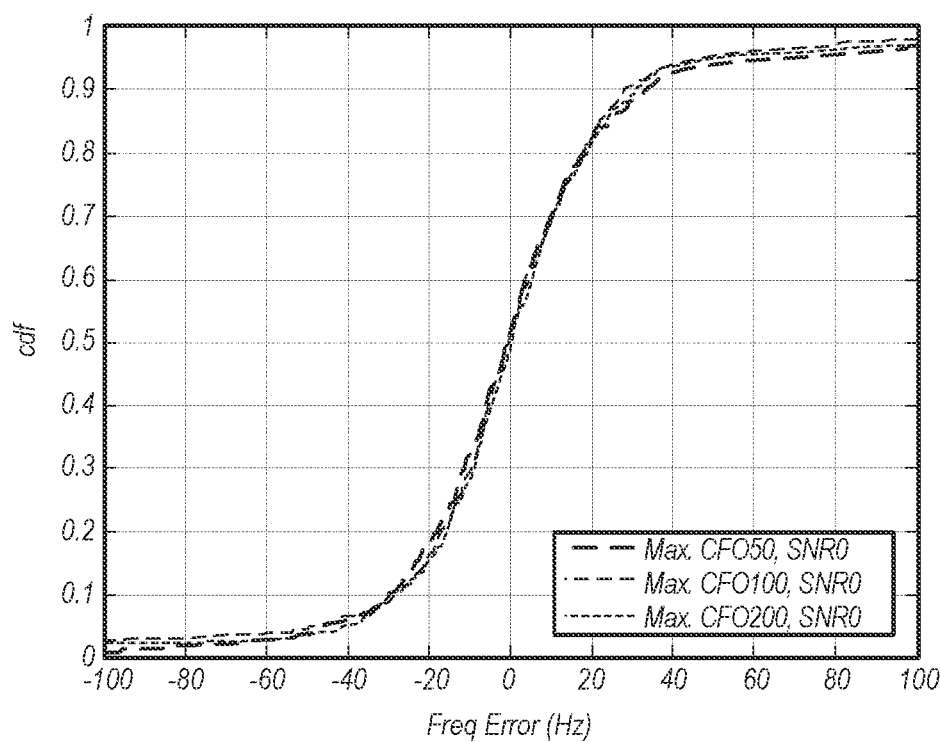
Figure 45:
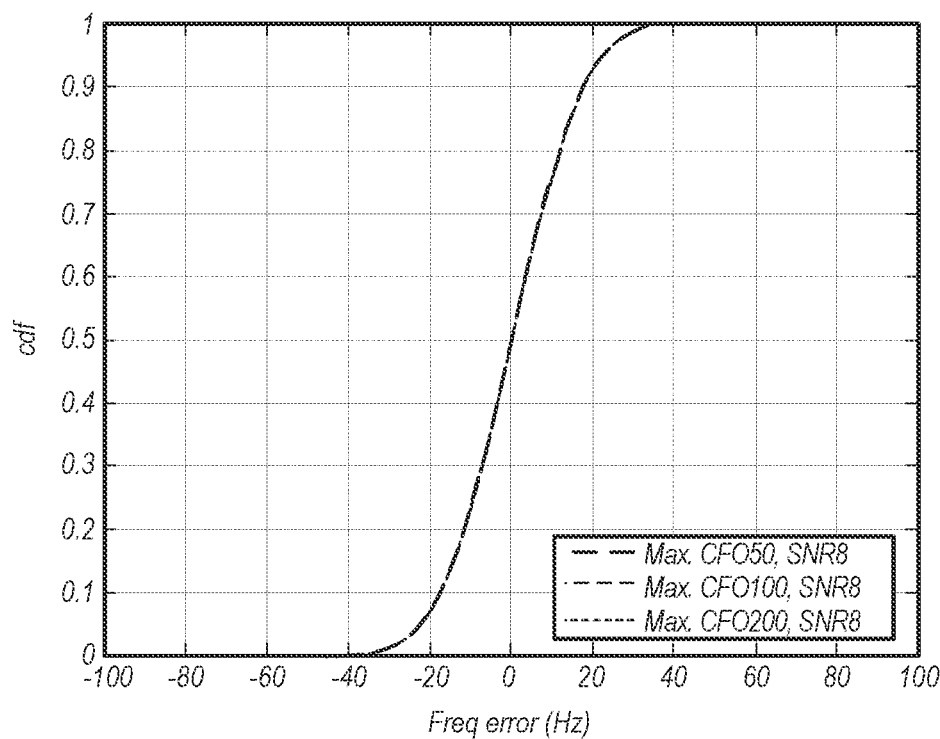

FIGS. 38-43 illustrate further exemplary simulated results, showing the carrier frequency residual error of different CFO schemes, at various SNRs using different channel models. The simulated results may suggest a consistent CFO estimation error (e.g., error may not depend on initial maximum CFO). FIGS. 38 and 39 use the AWGN model at SNR equal to 0 or 8, respectively. FIGS. 40 and 41 use the EPA 5 low model at SNR equal to 0 or 8, respectively. FIGS. 42 and 43 use the EPA 5 medium model at SNR equal to 0 or 8, respectively. FIGS. 44 and 45 use the EVA 30 low model at SNR equal to 0 or 8, respectively.

Figure 46:
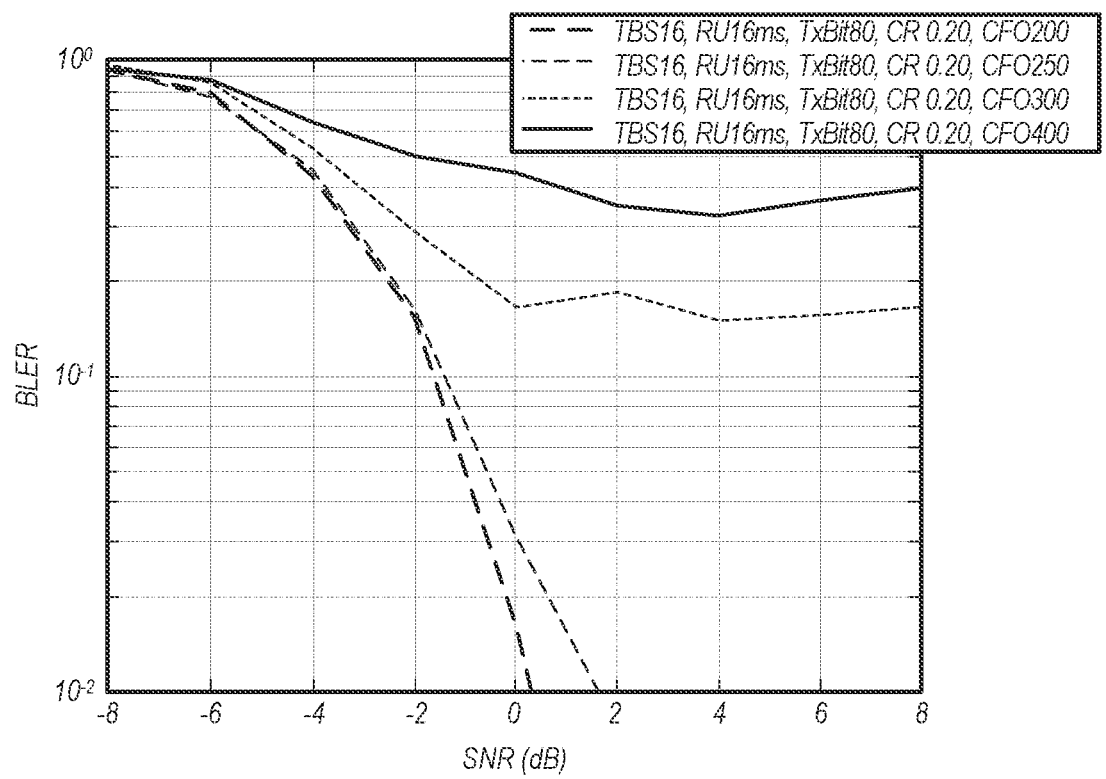
Figure 47:
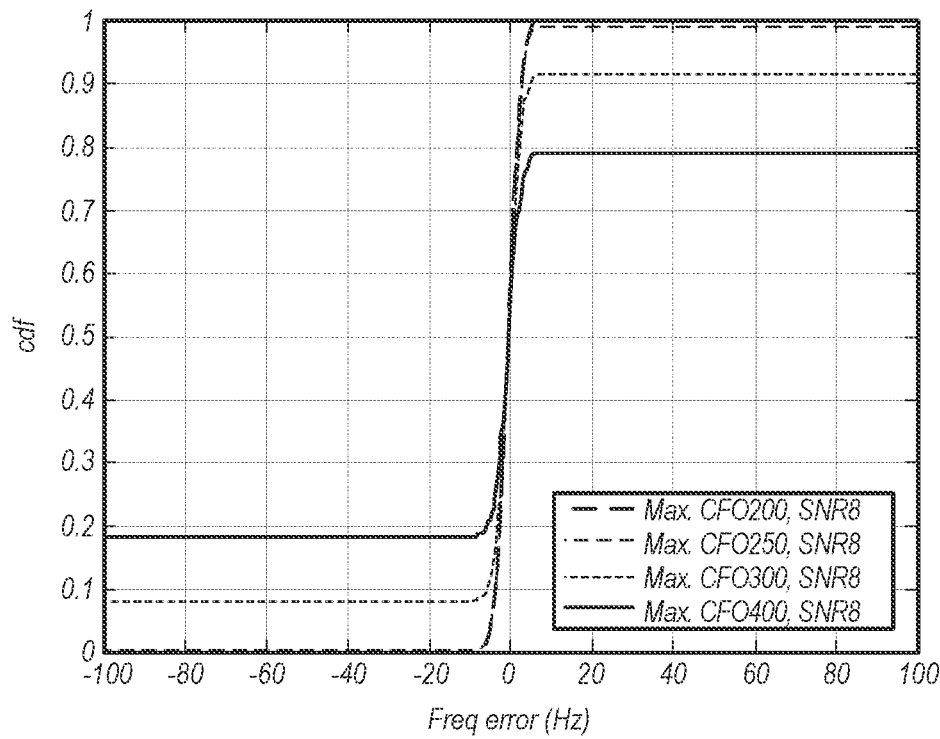
Figure 48:
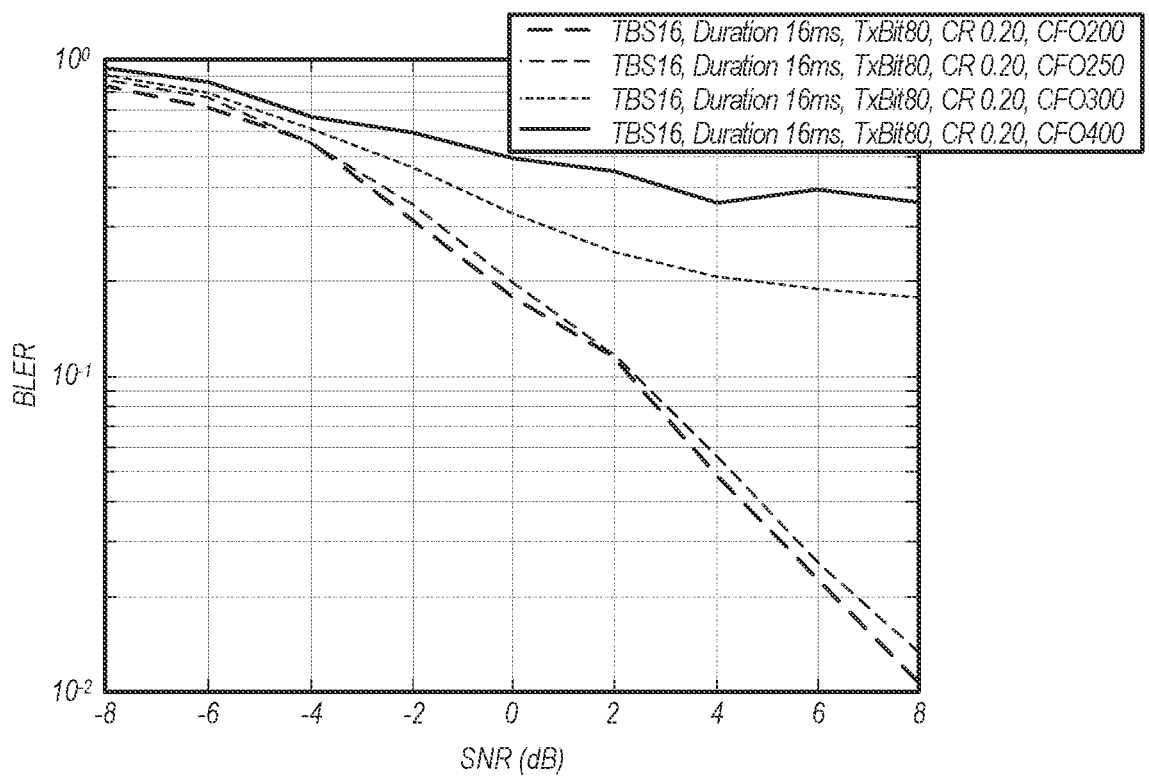
Figure 49:
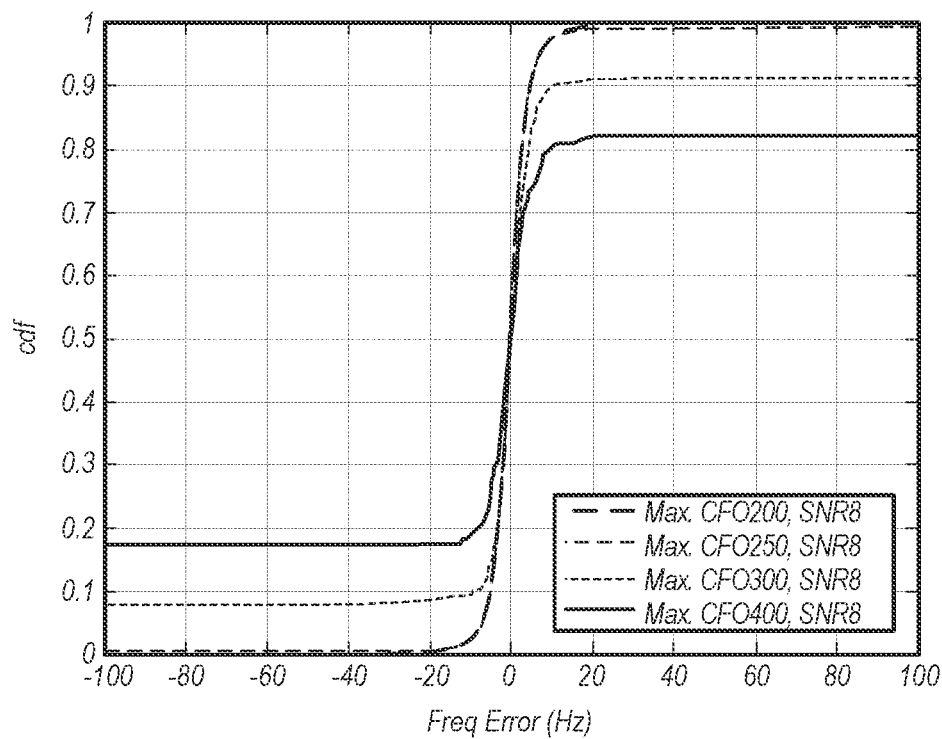
Figure 50:
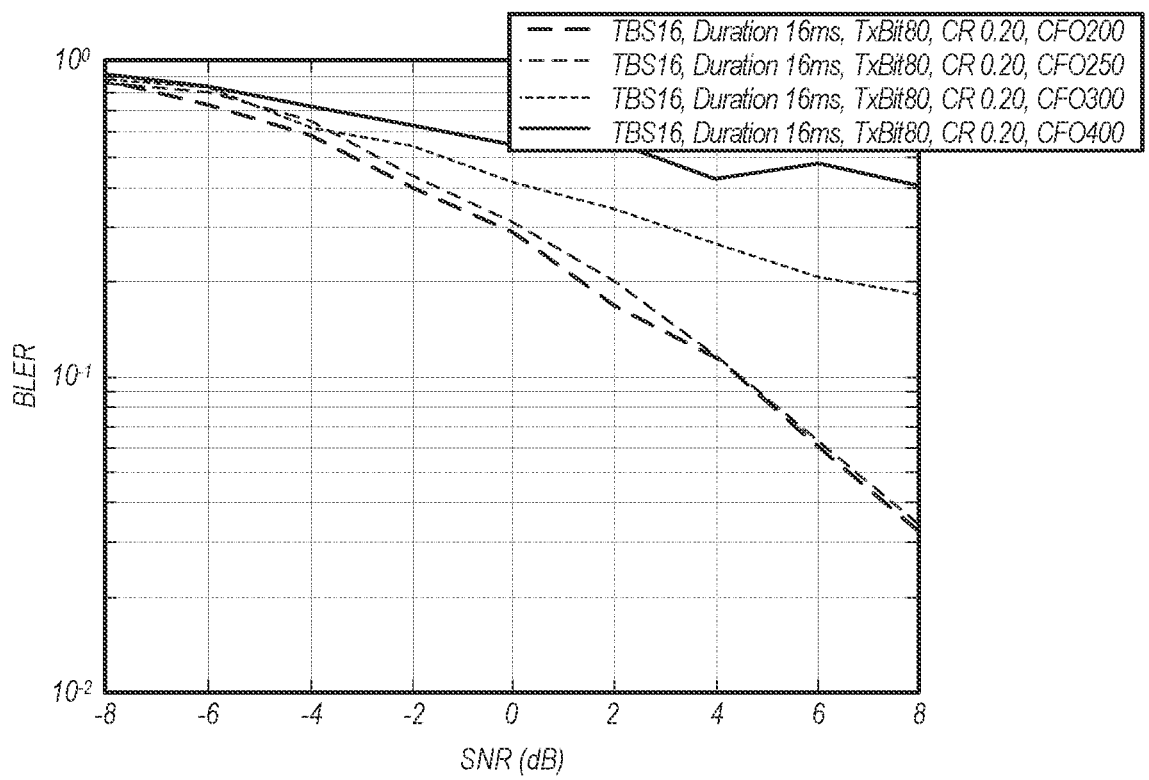
Figure 51:
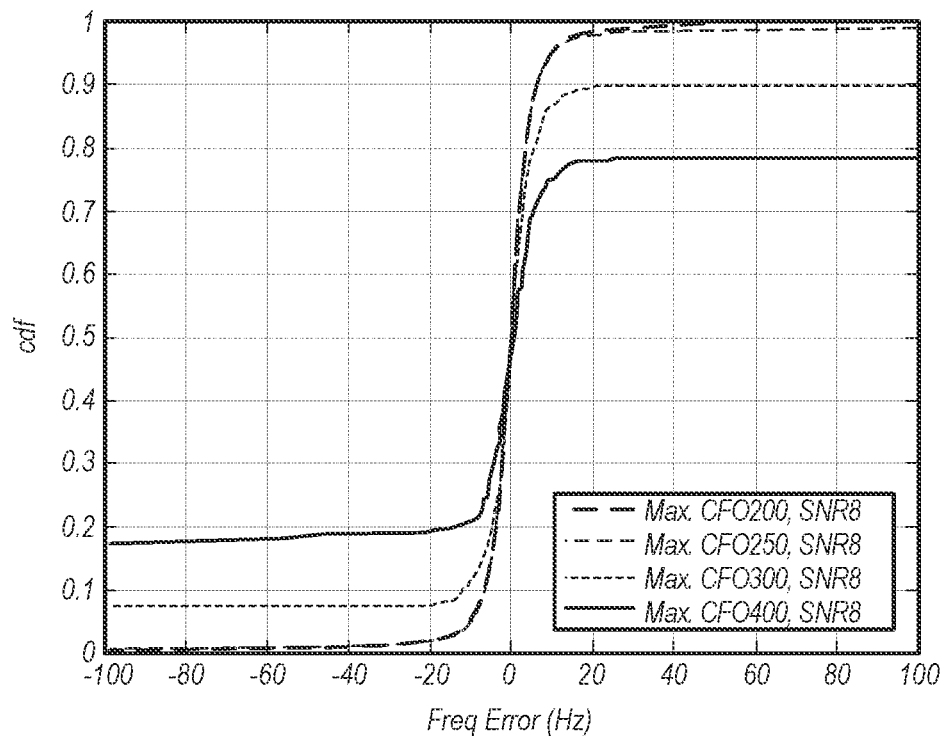
Figure 52:
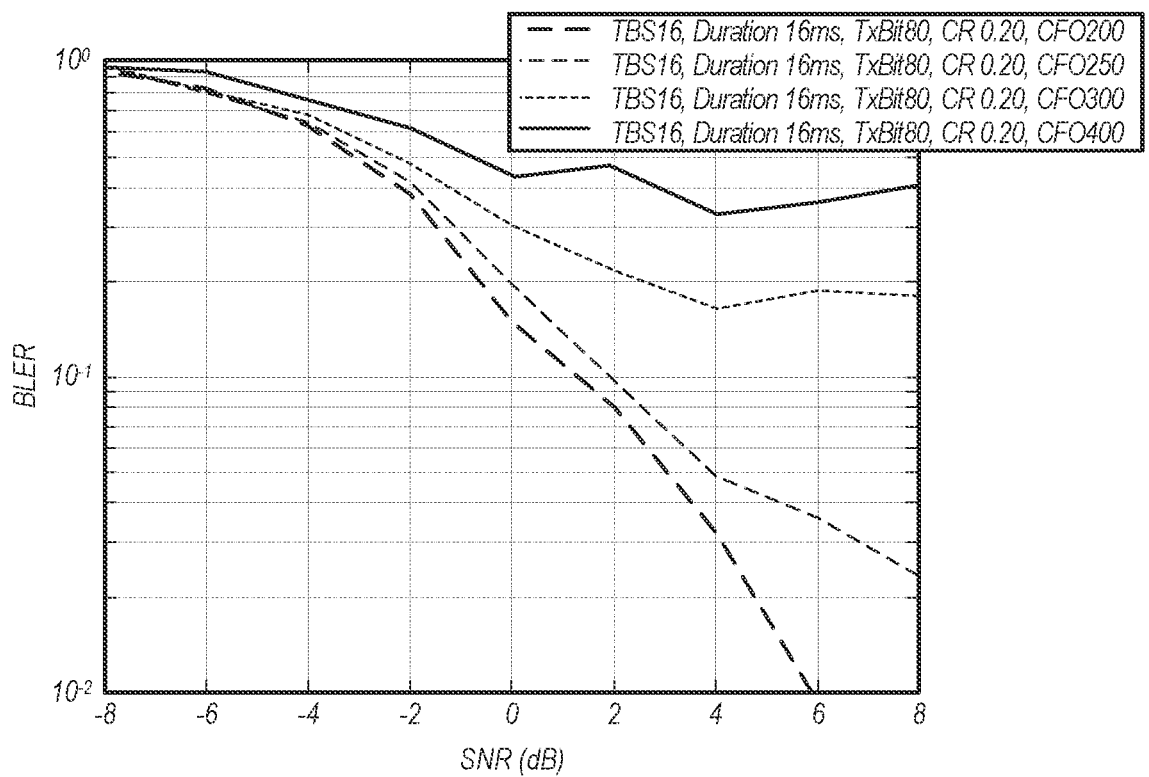
Figure 53:
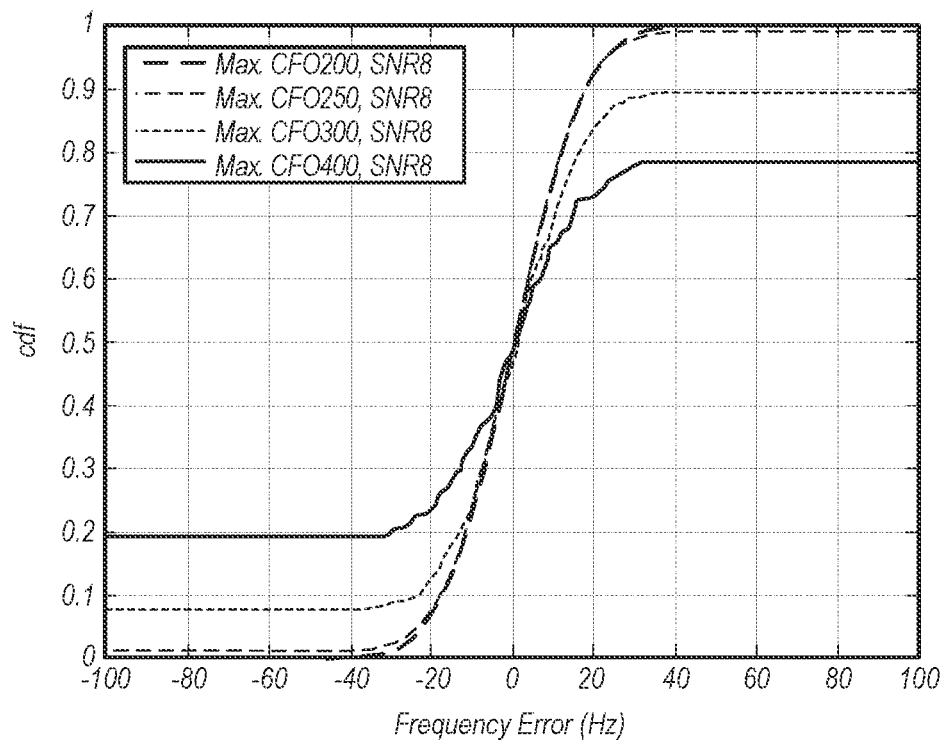

FIGS. 46-53 illustrate further exemplary simulated results, showing the improvements (e.g., pull-in range) of CFO refinement. FIGS. 46 and 47 use AWGN. FIGS. 48 and 49 use EPA 5 low. FIGS. 50 and 51 use EPA 5 medium. FIGS. 52 and 53 use EVA 30 low. Collectively, these results may suggest a pull-in range of approximately 250 Hz, e.g., for each of the models.

Figures 54, 55:
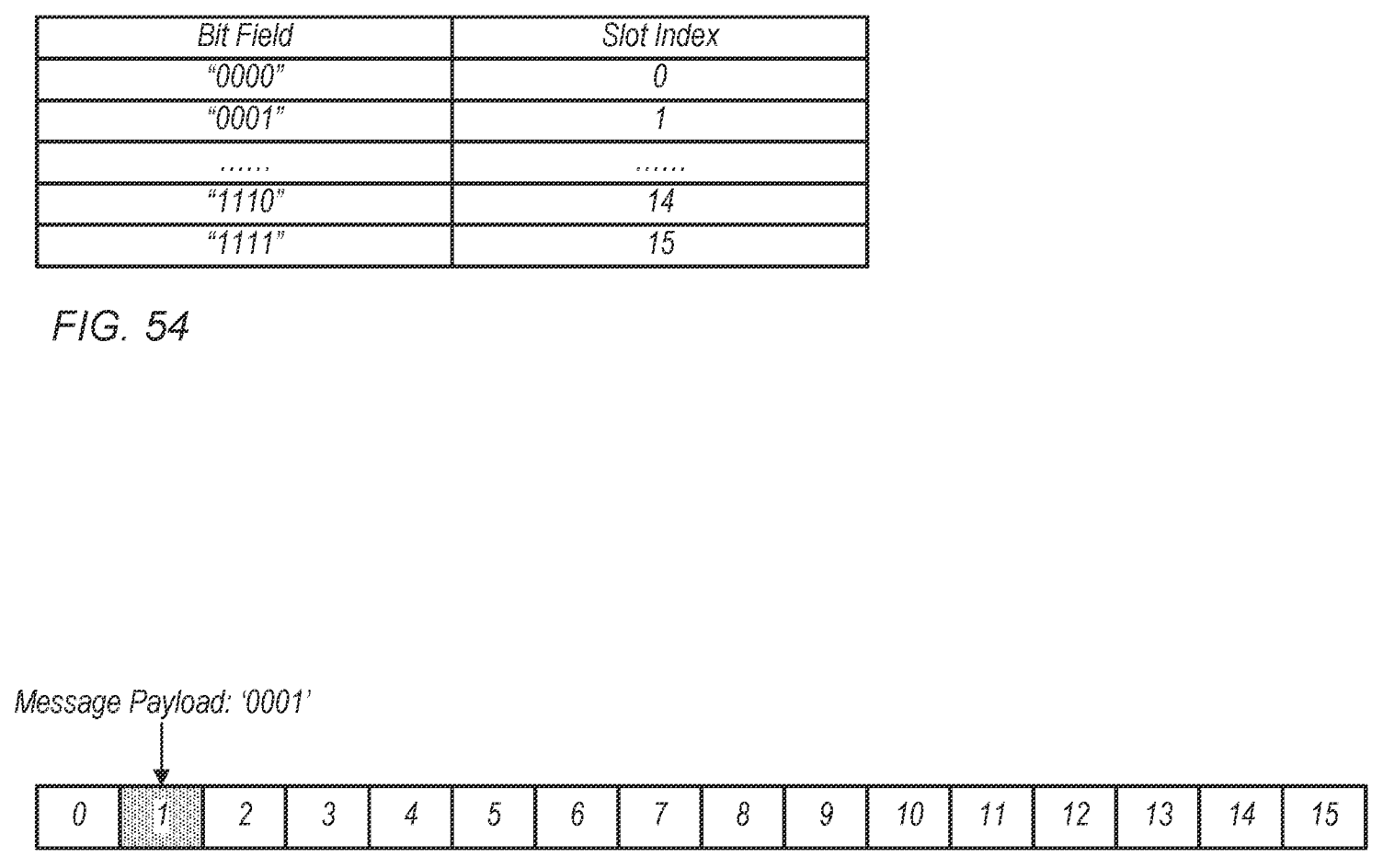

FIGS. 54 and 55—Exemplary Mapping Scheme and Additional Information

FIG. 54 illustrates a table of a 4-bit field and slot index. As shown, if an index describes 16 possible slots, up to 4-bits of information may be offloaded (e.g., 2^4=16).

FIG. 55 illustrates that, if a message is transmitted using one of the slots (e.g., slot 1, in the illustrated example), the 4-bits of the message payload can be determined based on the slot index (e.g., using the table of FIG. 54). In the illustrated example, slot 1 corresponds to a message payload of "0001".

It will be appreciated that the example of FIGS. 54 and 55 is illustrative only. The index may be a frequency index, a time index (e.g., denominated in symbols, milliseconds, or other units of time in addition to slots), or a combined time and frequency index. Similarly, other numbers of index values may allow offloading of different amounts of payload (e.g., a different length bit field). For example, 32 possible index values could offload 5 bits of message payload (e.g., a 5-bit field) because 2^5=32. Further, the example of FIGS. 54 and 55 could apply to discovery messaging and/or to other types of messages.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs.

Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a first wireless device to:
subdivide an identifier into a first portion of the identifier and a second portion of the identifier;
transmit a sequence, including the first portion of the identifier, to a second wireless device;
generate a payload, including a non-offloaded part of the second portion of the identifier;
select, based on an offloaded part of the second portion of the identifier, a resource from a plurality of available resources, wherein the resource comprises an implicit indication of the offloaded part of the second portion of the identifier; and
transmit the payload on the resource to the second wireless device, wherein the payload and the implicit indication of the offloaded part of the second portion of the identifier are useable to determine the second portion of identifier.

2. The apparatus of claim 1, wherein the identifier includes a receiver identifier.

3. The apparatus of claim 1, wherein the identifier includes an initiator identifier.

4. The apparatus of claim 1, wherein the resource is selected further based on a frame number.

5. The apparatus of claim 1, wherein the resource is selected further based on a value of prior known information.

6. The apparatus of claim 1, wherein the payload includes at least one bit that is not part of the identifier, wherein the resource comprises an implicit indication of the at least one bit that is not part of the identifier.

7. A second wireless device, comprising:
a radio; and
a processor configured to cause the second wireless device to:
receive a synchronization preamble, including a first portion of an identifier, from a first wireless device;
determine at least one resource to monitor during a subsequent time window, wherein the at least one resource is selected from a plurality of available resources;
receive a message on a first resource of the at least one resource during the subsequent time window, wherein the message includes a non-offloaded part of a second portion of the identifier;
determine an offloaded part of the second portion of the identifier based at least in part on an identity of the first resource, wherein the offloaded part of the second portion of the identifier is not explicitly included in the message; and
determine a complete identifier, wherein the complete identifier includes the non-offloaded part of the second portion of the identifier and the offloaded part of the second portion of the identifier.

8. The second wireless device of claim 7, wherein the synchronization preamble is received during a synchronization preamble window, wherein the message includes a device to device discovery message.

9. The second wireless device of claim 7, wherein the synchronization preamble indicates at least one of:
identification information for the first wireless device;
identification information for the second wireless device; or
a common presence identifier.

10. The second wireless device of claim 7, wherein the at least one resource includes only the first resource.

11. The second wireless device of claim 10, wherein the first resource comprises a single subcarrier associated with the identifier.

12. The second wireless device of claim 11, wherein the identifier is a recipient identifier of the second wireless device.

13. The second wireless device of claim 11, wherein the identifier is a common presence identifier.

14. The second wireless device of claim 7, wherein the synchronization preamble includes a common presence identifier, wherein the at least one resource includes all resources of the plurality of available resources.

15. The second wireless device of claim 7, wherein the identifier includes a receiver identifier.

16. A method, comprising:
at a second wireless device:
receiving a synchronization preamble, including a first portion of an identifier, from a first wireless device;
determining at least one resource to monitor during a subsequent time window, wherein the at least one resource is selected from a plurality of available resources;
receiving a message on a first resource of the at least one resource during the subsequent time window, wherein the message includes a non-offloaded part of a second portion of the identifier;
determining an offloaded part of the second portion of the identifier based at least in part on an identity of the first resource, wherein the offloaded part of the second portion of the identifier is not explicitly included in the message; and
determining a complete identifier, wherein the complete identifier includes the non-offloaded part of the second portion of the identifier and the offloaded part of the second portion of the identifier.

17. The method of claim 16, wherein the synchronization preamble is received during a synchronization preamble window, wherein the message includes a device to device discovery message.

18. The method of claim 16, wherein the synchronization preamble indicates at least one of:
   identification information for the first wireless device;
   identification information for the second wireless device; or
   a common presence identifier.

19. The method of claim 16, wherein the at least one resource includes only the first resource.

20. The method of claim 16, wherein the first resource comprises a single subcarrier associated with the identifier.

* * * * *